United States Patent
Ickin et al.

(10) Patent No.: US 12,542,835 B2
(45) Date of Patent: Feb. 3, 2026

(54) TRANSLATING SENSORY COMMUNICATIONS

(71) Applicant: Telefonaktiebolaget LM Ericsson (publ), Stockholm (SE)

(72) Inventors: Selim Ickin, Danderyd (SE); Amin Azari, Järfälla (SE); Carmen Lee Altmann, Täby (SE); Anusha Pradeep Mujumdar, Bangalore (IN); Jalil Taghia, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 83 days.

(21) Appl. No.: 18/292,118

(22) PCT Filed: Jul. 27, 2021

(86) PCT No.: PCT/IB2021/056806
§ 371 (c)(1),
(2) Date: Jan. 25, 2024

(87) PCT Pub. No.: WO2023/007213
PCT Pub. Date: Feb. 2, 2023

(65) Prior Publication Data
US 2025/0097314 A1     Mar. 20, 2025

(51) Int. Cl.
*G06N 3/09* (2023.01)
*H04L 67/12* (2022.01)
(Continued)

(52) U.S. Cl.
CPC ............ *H04L 67/565* (2022.05); *H04L 67/12* (2013.01); *G06N 3/0455* (2023.01); *G06N 3/0475* (2023.01)

(58) Field of Classification Search
CPC ....... H04L 67/565; H04L 67/12; H04L 67/30; G06N 3/0455; G06N 3/0475; G06N 3/09
(Continued)

(56) References Cited

U.S. PATENT DOCUMENTS

| 10,594,757 B1 * | 3/2020 | Shevchenko | .......... H04N 7/148 |
| 2014/0282586 A1 * | 9/2014 | Shear | .................... G06F 16/245 |
| | | | 718/104 |

(Continued)

FOREIGN PATENT DOCUMENTS

| CN | 110992783 A * | 4/2020 | ............. G06V 40/28 |
| KR | 20210073856 A * | 6/2021 | ............. G06V 40/28 |

OTHER PUBLICATIONS

International Search Report and Written Opinion dated May 23, 2022 filed in PCT Application No. PCT/IB2021/056806 filed Jul. 27, 2021, consisting of 17 pages.
(Continued)

*Primary Examiner* — Moustafa M Meky
*Assistant Examiner* — Elizabeth Kassa
(74) *Attorney, Agent, or Firm* — Sonoda & Kobayashi Intellectual Property Law; Darren M. Gardner

(57) ABSTRACT

A computer implemented method for translating a sensory input to a sensory output for communication between first and second entities. The first entity includes a user and the second entity includes a user or a computing system. The method includes obtaining a first profile specifying a communication capability of the first entity, and a second profile specifying a communication capability of the second entity and obtaining a trained Machine Learning (ML) model operable to map an input sensory communication in accordance with one of the first or second profiles to an output sensory communication in accordance with the other of the profiles. The method further includes receiving an input
(Continued)

sensory communication from one of the first or second entities, using the ML model to map the input sensory communication to an output sensory communication, and providing the output sensory communication to the other of the entities.

18 Claims, 20 Drawing Sheets

(51) Int. Cl.
　　*H04L 67/30*　　　(2022.01)
　　*H04L 67/565*　　　(2022.01)
　　*G06N 3/0455*　　　(2023.01)
　　*G06N 3/0475*　　　(2023.01)

(58) Field of Classification Search
　　USPC ........................................................ 709/224
　　See application file for complete search history.

(56) References Cited

U.S. PATENT DOCUMENTS

| | | | |
|---|---|---|---|
| 2016/0034305 A1* | 2/2016 | Shear | G06F 9/50 |
| | | | 707/722 |
| 2019/0213465 A1* | 7/2019 | Avrahami | G10L 15/197 |
| 2019/0362149 A1* | 11/2019 | Mukhopadhyay | G06V 20/20 |
| 2020/0175961 A1* | 6/2020 | Thomson | G10L 15/063 |
| 2020/0228452 A1* | 7/2020 | Boss | H04L 41/16 |
| 2021/0073856 A1* | 3/2021 | Shaw | G06Q 30/0275 |
| 2021/0099813 A1* | 4/2021 | Spieler | H04R 25/554 |
| 2021/0289070 A1* | 9/2021 | Thomson | H04M 1/72475 |
| 2021/0350068 A1* | 11/2021 | Sanossian | G06F 16/258 |
| 2023/0156413 A1* | 5/2023 | Verhulst | G06N 3/084 |
| | | | 381/314 |
| 2024/0233774 A1* | 7/2024 | Nance | G06N 3/08 |

OTHER PUBLICATIONS

Zhang et al., Cross-Modal Contrastive Learning for Text-to-Image Generation; Cornell University, Jan. 12, 2021, consisting of 3 pages.

Westerberg et al., The innovation potential of Non Real-time RAN Intelligent Controller, Ericsson, Oct. 21, 2020, consisting of 8 pages.

Vepakomma et al., Split learning for health: Distributed deep learning without sharing raw patient data, 32nd Conference on Neural Information Processing Systems (NIPS 2018), Montreal, Canada, Dec. 3, 2018, consisting of 7 pages.

Radford et al., Learning Transferable Visual Models From Natural Language Supervision, Cornell University, Feb. 26, 2021, consisting of 3 pages.

Radford et al., CLIP: Connecting text and images, OpenAI, Jan. 5, 2021, consisting of 23 pages.

Mathas, The Five Senses of Sensors—Taste, DigiKey, Jul. 21, 2011, consisting of 4 pages.

Mathas, The Five Senses of Sensors—Smell, DigiKey, Jul. 28, 2011, consisting of 4 pages.

* cited by examiner

| Source profile (can be either user or machine) | Destination profile (can be either user or machine) | Source-to-Common translator model | Destination-to-Common translator model | Common-to-Source translator model | Common-to-machine translator model | Model download time | User Response time ($T_{TaskComplete} - T_{TaskStart}$) | Quality rating (Q) registered by user |
|---|---|---|---|---|---|---|---|---|
| Profile A | Profile B | $M_{A\text{-to-Common}}$ | $M_{B\text{-to-Common}}$ | $M_{common\text{-to-}A}$ | $M_{common\text{-to-}B}$ | 5s | 2 min | 4/5 |
| ... | | | | | | | | |
| Profile X | Profile Z | $M_{X\text{-to-Common, 1}}$ | $M_{Z\text{-to-Common, 2}}$ | $M_{common\text{-to-}X, 1}$ | $M_{common\text{-to-}Z, 2}$ | 4s | 3 min | 5/5 |
| Profile X | Profile Z | $M_{X\text{-to-Common, 2}}$ | $M_{Z\text{-to-Common, 2}}$ | $M_{common\text{-to-}X2}$ | $M_{common\text{-to-}Z, 2}$ | 10s | 5 min | 2/5 |

Fig. 8

TRANSLATING SENSORY COMMUNICATIONS

CROSS-REFERENCE TO RELATED APPLICATION

This application is a Submission Under 35 U.S.C. § 371 for U.S. National Stage Patent Application of International Application Number: PCT/IB2021/056806, filed Jul. 27, 2021 entitled "TRANSLATING SENSORY COMMUNICATIONS," the entirety of which is incorporated herein by reference.

TECHNICAL FIELD

The present disclosure relates to a method for translating a sensory input to a sensory output for communication between first and second entities. The present disclosure also relates to a translation system, and to a computer program and a computer program product configured, when run on a computer to carry out methods for translating a sensory input to a sensory output for communication between first and second entities.

BACKGROUND

Automation machines designed for interaction with a human user are highly prevalent in a wide range of commercial, industrial and institutional settings. Examples of such machines include vending machines, ATM machines, parking payment machines, flight check-in stations, automated check-out machines, etc. The vast majority of these machines are designed with the assumption that users will have certain capabilities enabling them to interact with the machine to complete a task. These assumptions may not be valid for all users, who may have a wide range of capabilities relevant to interacting with automated machines. It is consequently desirable to improve existing automated machines by ensuring that users of all abilities are able to interact with machines and accomplish the full range of tasks for which machines are designed.

Various techniques and tools exist to enable people with limited sensory capabilities to communicate and interact with technology and other people. These tools include tactile writing systems for those with visual impairments, sign language for those with hearing impairments etc. Electronic assistance devices are also well known, including systems for audio description of visual media, hearing aids, and a wide range of personalised communication systems for those with loss of motor function. Although similar advancements to support smell and taste are less prevalent, electronic devices such as e-smell and e-taste exist, and are able to quantify the amount of different organic compounds in a substance. These devices can for example identify hazardous material in food or in the air.

Electronic devices are also commonly installed in automated machines to enable them to interpret sensory communications. For example, a camera may enable a machine to detect visual signals for interpretation, a microphone may facilitate voice control of a machine etc.

Existing electronic devices to support sensory communication, either for human users or for automated machines, are generally specific either to a particular sensory function or to a particular task. Such devices can also be expensive, obtrusive, or simply ill suited to the needs of a specific user to user, or user to machine, interaction. Mismatch between sensory communication capabilities or users and/or machines remains common, and is a considerable barrier to seamless interaction between users, and between users and machines.

SUMMARY

It is an aim of the present disclosure to provide methods, a system and a computer readable medium which at least partially address one or more of the challenges discussed above. It is a further aim of the present disclosure to provide methods, a system, and a computer readable medium which facilitate interaction between entities having different sensory communication capabilities. These entities may be human users and/or may be automated machines.

According to a first aspect of the present disclosure, there is provided a computer implemented method for translating a sensory input to a sensory output for communication between first and second entities, wherein the first entity comprises a user and the second entity comprises a user or a computing system. The method, performed by a translation system, comprises obtaining a first profile specifying a communication capability of the first entity, and a second profile specifying a communication capability of the second entity. The method further comprises obtaining a trained Machine Learning (ML) model operable to map an input sensory communication in accordance with one of the first or second profiles to an output sensory communication in accordance with the other of the first or second profiles. The method further comprises receiving an input sensory communication from one of the first or second entities, using the ML model to map the input sensory communication to an output sensory communication, and providing the output sensory communication to the other of the first or second entities.

According to another aspect of the present disclosure, there is provided a computer implemented method for training an ML model to map an input sensory communication in accordance with one of a first communication capability to an output sensory communication in accordance with a second communication capability. The ML model is for use in translating a sensory input to a sensory output for communication between first and second entities, and the first entity comprises a user and the second entity comprises a user or a computing system. The method, performed by a training node, comprises using a reference ML model to map input sensory communications from a training data set to a representation of an information content of the input sensory communications, the input sensory communications being expressed using a plurality of sensory capabilities. The method further comprises using a target ML model to map the input sensory communications from the training data set to a representation of the information content of the input sensory communications, the input sensory communications being expressed using a subset of the plurality of sensory capabilities. The method further comprises updating trainable parameters of the target ML model to minimize a loss function based upon a difference between the representations generated by the reference and target ML models.

According to another aspect of the present disclosure, there is provided a computer implemented method for facilitating combined control of an environment by first and second users. The method comprises receiving from the first user a first control action to be executed on the environment, receiving from the second user a second control action to be executed on the environment, and generating from the first and second control actions a combined control action for execution on the environment. The method further comprises initiating execution of the combined control action on the environment. Each of the first and second users has received a stimulus from the environment in the form of an input sensory communication, and generating from the first and second control actions a combined control action for execution on the environment comprises weighting contributions of the first and second control actions to the combined control action according to a comparison between a sensory capability required for receiving and interpreting the input sensory communication, and communication capability profiles of the first and second users.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any one or more of aspects or examples of the present disclosure.

According to another aspect of the present disclosure, there is provided a translation system for translating a sensory input to a sensory output for communication between first and second entities, wherein the first entity comprises a user and the second entity comprises a user or a computing system. The translation system comprises processing circuitry configured to cause the translation system to obtain a first profile specifying a communication capability of the first entity, and a second profile specifying a communication capability of the second entity. The processing circuitry is further configured to cause the translation system to obtain a trained ML model operable to map an input sensory communication in accordance with one of the first or second profiles to an output sensory communication in accordance with the other of the first or second profiles. The processing circuitry is further configured to cause the translation system to receive an input sensory communication from one of the first or second entities, to use the ML model to map the input sensory communication to an output sensory communication, and to provide the output sensory communication to the other of the first or second entities.

According to another aspect of the present disclosure, there is provided a training node for training a Machine Learning model to map an input sensory communication in accordance with a first communication capability to an output sensory communication in accordance with a second communication capability, wherein the ML model is for use in translating a sensory input to a sensory output for communication between first and second entities, and wherein the first entity comprises a user and the second entity comprises a user or a computing system. The training node comprises processing circuitry configured to cause the training node to use a reference ML model to map input sensory communications from a training data set to a representation of an information content of the input sensory communications, wherein the input sensory communications are expressed using a plurality of sensory capabilities. The processing circuitry is further configured to cause the training node to use a target ML model to map the input sensory communications from the training data set to a representation of the information content of the input sensory communications, wherein the input sensory communications are expressed using a subset of the plurality of sensory capabilities. The processing circuitry is further configured to cause the training node to update trainable parameters of the target ML model to minimize a loss function based upon a difference between the representations generated by the reference and target ML models.

According to another aspect of the present disclosure, there is provided a control node for facilitating combined control of an environment by first and second users. The control node comprises processing circuitry configured to cause the control node to receive from the first user a first control action to be executed on the environment, and to receive from the second user a second control action to be executed on the environment. The processing circuitry is further configured to cause the control node to generate from the first and second control actions a combined control action for execution on the environment, and to initiate execution of the combined control action on the environment. Each of the first and second users has received a stimulus from the environment in the form of an input sensory communication. Generating from the first and second control actions a combined control action for execution on the environment comprises weighting contributions of the first and second control actions to the combined control action according to a comparison between a sensory capability required for receiving and interpreting the input sensory communication, and communication capability profiles of the first and second users.

Examples of the present disclosure thus provide methods and systems that facilitate interaction between entities having different sensory communication capabilities. These entities may be human users and/or may be machines, and examples of the present disclosure may thus enable autonomous functionality in a machine when interacting with a user having sensory communication capabilities that are different from those assumed at the time of machine design.

BRIEF DESCRIPTION OF THE DRAWINGS

For a better understanding of the present disclosure, and to show more clearly how it may be carried into effect, reference will now be made, by way of example, to the following drawings in which:

FIG. 8 is a table illustrating communication contexts and user ratings;

DETAILED DESCRIPTION

Examples of the present disclosure seek to facilitate communication between entities having different sensory communication capabilities. Sensory communication capabilities may encompass the capability to receive and interpret a sensory communication (vision, hearing, smell, etc.), and/or the capability to generate a sensory communication (actuation capability, motor control, etc.). Examples of the present disclosure use a Machine Learning (ML) model to translate between sensory communications, so as to compensate for a lack of a particular sensory capability that may be necessary for interaction with a particular human user and/or a particular machine.

Figure 1:
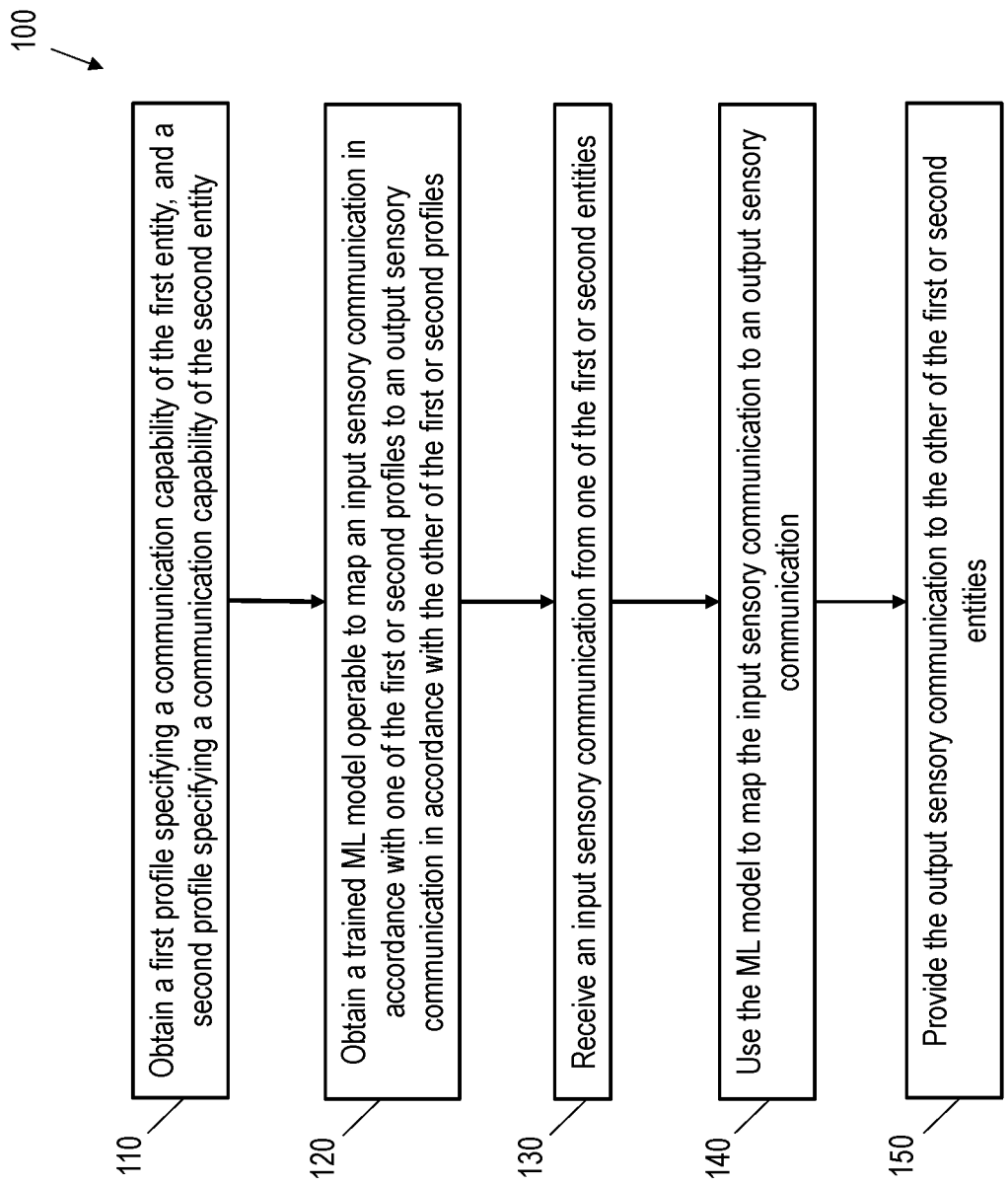
FIG. 1 is a flow chart illustrating process steps in a computer implemented method for translating a sensory input to a sensory output for communication between first and second entities.

FIG. 1 is a flow chart illustrating process steps in a computer implemented method 100 for translating a sensory input to a sensory output for communication between first and second entities, wherein the first entity comprises a user and the second entity comprises a user or a computing system. The method is performed by a translation system, which may comprise a single node or multiple nodes. Each node of the translation system may comprise a physical or virtual node, and may be implemented in a computer system, computing device or server apparatus and/or in a virtualized environment, for example in a cloud, edge cloud or fog deployment. Examples of a virtual node may include a piece of software or computer program, a code fragment operable to implement a computer program, a virtualised function, or any other logical entity. One or more nodes of the translation system may for example be implemented in a core network or a Radio Access Network (RAN) of a communication network. In some examples, one or more nodes of the translation system may be implemented in a Radio Access node such as a NodeB, eNodeB, gNodeB, or any future implementation of functionality for exchange and orchestration of wireless signals. One or more nodes of the translation system may also be implemented as functions in an Open Radio Access Network (ORAN) or Virtualised Radio Access Network (vRAN). Each node of the translation system may encompass multiple logical entities, and may for example comprise a Virtualised Network Function (VNF).

Referring to FIG. 1, in a first step 110, the method 100 comprises obtaining a first profile specifying a communication capability of the first entity, and a second profile specifying a communication capability of the second entity. The method 100 then comprises, in step 120, obtaining a trained ML model operable to map an input sensory communication in accordance with one of the first or second profiles to an output sensory communication in accordance with the other of the first or second profiles. In step 130, the method 100 comprises receiving an input sensory communication from one of the first or second entities. The method 100 then comprises using the ML model to map the input sensory communication to an output sensory communication in step 140, and providing the output sensory communication to the other of the first or second entities in step 150. As discussed in greater detail below, nodes of the translation system may be implemented at a user device of the first entity, and/or at the second entity.

For the purposes of the present disclosure, it will be appreciated that an ML model is considered to comprise the output of a Machine Learning algorithm or process, wherein an ML process comprises instructions through which data may be used in a training procedure to generate a model artefact for performing a given task, or for representing a real world process or system. An ML model is the model artefact that is created by such a training procedure, and which comprises the computational architecture that performs the task.

FIGS. 2*a* to 2*e* show flow charts illustrating process steps in another example of computer implemented method 200 for translating a sensory input to a sensory output for communication between first and second entities, wherein the first entity comprises a user and the second entity comprises a user or a computing system. The method 200 provides various examples of how the steps of the method 100 may be implemented and supplemented to achieve the above discussed and additional functionality. As for the method 100, the method 200 is performed by a translation system, which may comprise a single node or multiple nodes. Each node of the translation system may comprise a physical or virtual node, and may be implemented as discussed above with reference to the method 100.

Figure 2A:
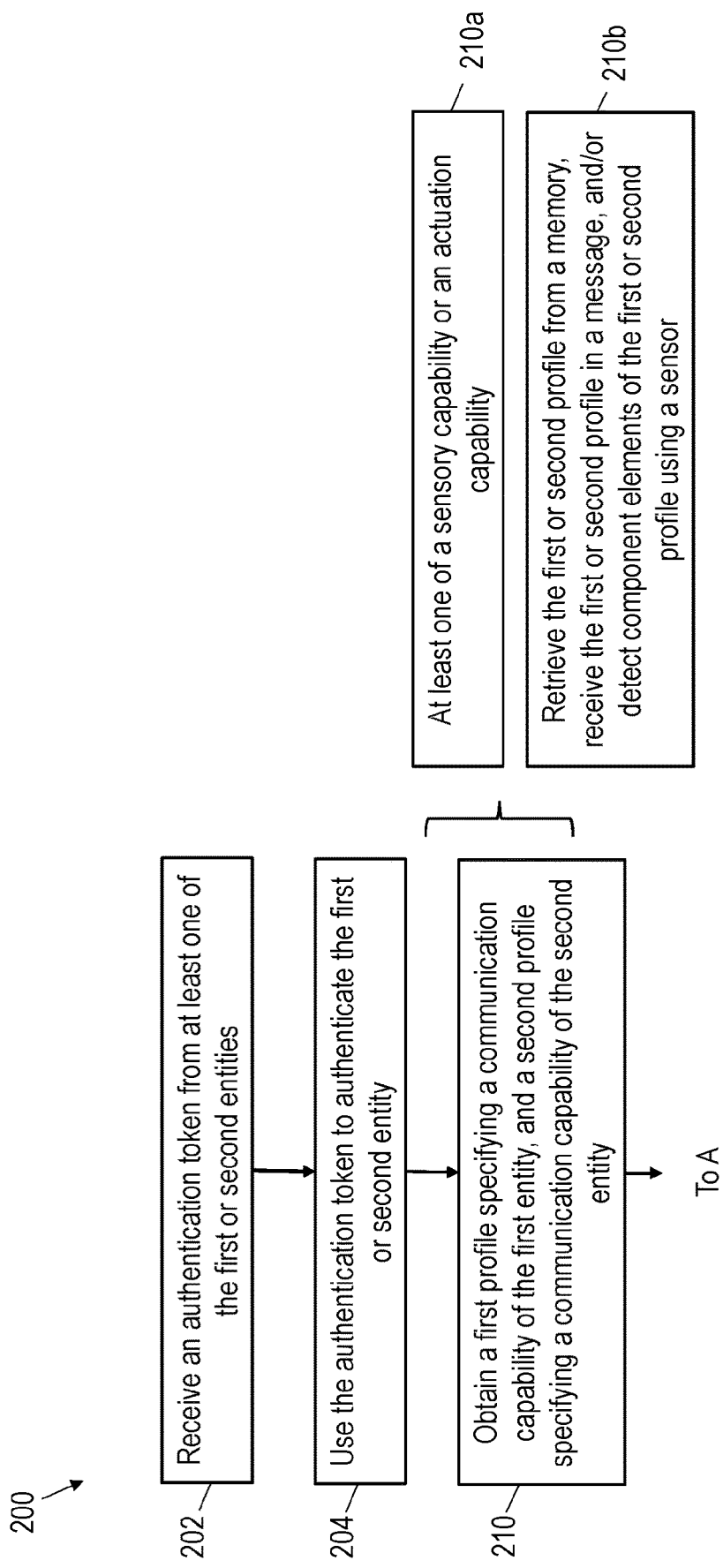
FIGS. 2a to 2e show a flow chart illustrating process steps in another example of computer implemented method for translating a sensory input to a sensory output for communication between first and second entities.

Referring initially to FIG. 2*a*, in a first step 202, the translation system receives an authentication token from at least one of the first or second entities. The translation system then, in step 204, uses the authentication token to authenticate the first or second entity. Step 204 may be carried out in communication with an authentication server, via comparison between the token and a detected characteristic of the entity, etc.

In step 210, the translation system obtains a first profile specifying a communication capability of the first entity, and a second profile specifying a communication capability of the second entity. As illustrated at 210*a*, a communication capability comprises at least one of a sensory capability or an actuation capability. A sensory capability comprises a capability to detect and interpret a sensory stimulus. Sensory stimuli may be visual, auditory, tactile, gustatory, olfactory, etc. An actuation capability comprises a capability to interact in some manner with an entity, for example by generating a sensory communication. An actuation capability may consequently encompass capacity for movement, a measure of strength, fine motor control, etc. In some examples, an actuation capability may be dependent upon a sensory capability, for example a blind person may have the physical capacity to interact with a touch screen but is unable to use this capacity to generate a sensory input, owing to the inability to see the screen and determine where to touch the screen. It will be appreciated that the profiles of the first and second entities may comprise some overlap in the communication capabilities specified in the profiles. Thus for example some interactions between first and second entities may be possible without translation, while for other interactions, translation between sensory communication compatible with the first and second profiles may be appropriate, useful, or necessary to support an interaction between the first and second entities.

As illustrated at 210*b*, obtaining at least one of a first or second profile specifying a communication capability of the first or second entity may comprise at least one of retrieving the first or second profile from a memory, receiving the first or second profile in a message, and/or detecting component elements of the first or second profile using a sensor. The memory from which a profile is retrieved may be in a user device of the first entity or a computing system, and a message may be received from a user device or computing system, or from an administration entity, for example hosted in the cloud. The message may be received over the Bluetooth interface, a RAN interface, WiFi interface, etc. Sensors for detecting elements of a profile may include a camera, microphone etc. and may be in communication for example with a computing system. One or more sensors may be operable to detect communication capabilities of an entity. For example, a camera mounted in a computing system in the form of an automated machine may be operable to detect one or more sensory and/or actuation capabilities of a human user in proximity to the machine.

Figure 2B:
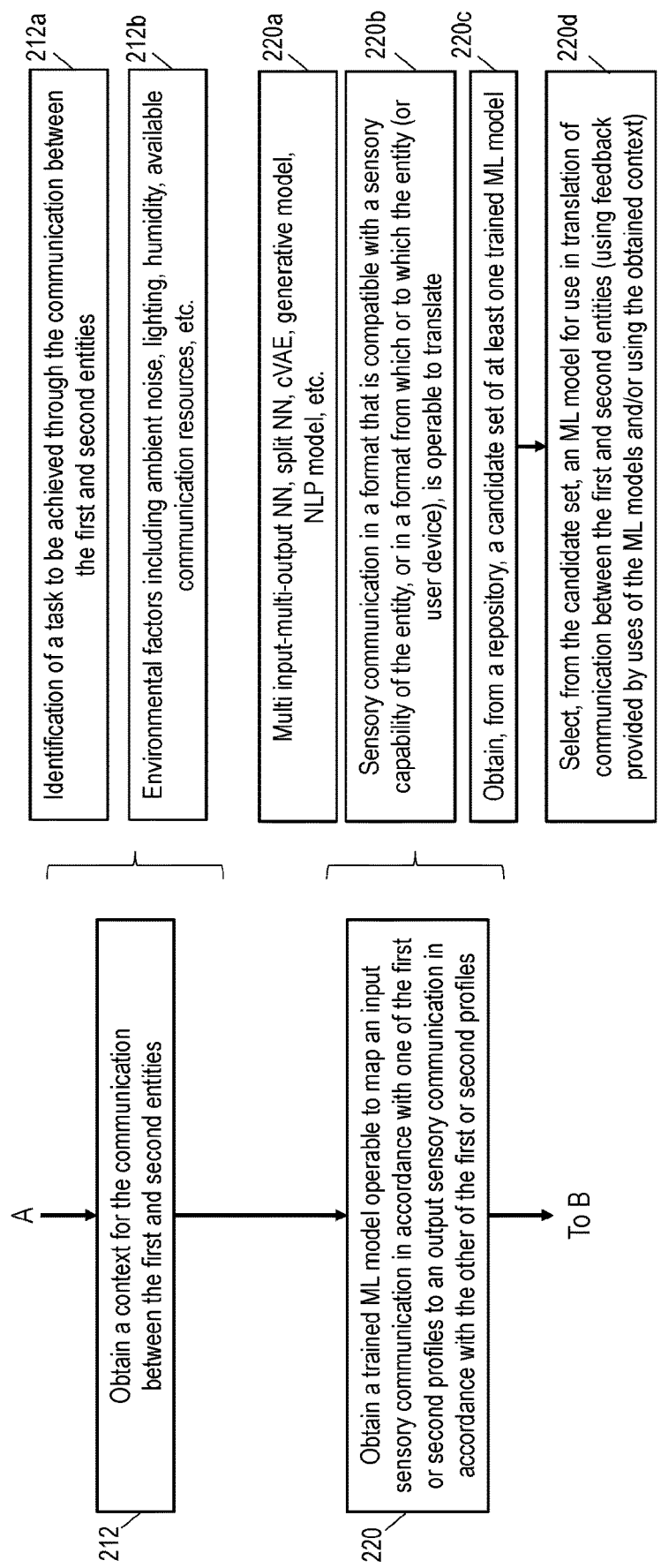

Referring now to FIG. 2b, in step 212, the translation system obtains a context for the communication between the first and second entities. As illustrated at 212a, the obtained context comprises an identification of a task to be achieved through the communication between the first and second entities. In the case for example of a second entity comprising a computing system, the computing system may be operable to perform a range of tasks (which may be included in the computing system profile), the particular task that is to be achieved through communication between the first and second entities may impact the selection of an ML model for translation, as discussed below. As illustrated at 212b, the context may additionally comprise environmental factors such as ambient noise, humidity, and/or lighting in the location of the first and/or second entities, available communication resources in such locations, or any other environmental factor that may impact upon the communication between the first and second entities. For example, high ambient noise may complicate an audio or voice-based interaction between the entities, particularly if the human user has compromised or limited hearing. In another example, a touch screen may be difficult to use in heavy rain or snow, and in some cases touch sensors for the touch screen may become unreliable or non-functional in particularly extreme conditions. Consequently, an alternative means of interacting with a computing system that usually relies upon a touch screen may be preferable.

In step 220, the translation system obtains a trained ML model operable to map an input sensory communication in accordance with one of the first or second profiles to an output sensory communication in accordance with the other of the first or second profiles. As illustrated at 220a, the ML model may comprise at least one of a multi-input-multi output Neural Network, a split Neural Network, a conditional Variational AutoEncoder (cVAE), a generative model in general, a Natural Language Processing model etc. Examples of generative models include the cVAE and a Generative Adversarial Network (GAN). A wide range of Natural Language Processing (NLP) approaches exists, including the Bag-of-Words approach (as used in Tf-Idf), Word Embedding (as used in Word2Vec), and Language Models (as used in BERT). In some examples, any generative model that can estimate a marginal distribution given some multidimensional constraints and observations can be used as the ML model for translation.

The obtained ML model maps between sensory communications "in accordance with" one or other of the first and second profiles. As illustrated at 220b, a sensory communication in accordance with a profile of an entity comprises at least one of a sensory communication in a format that is compatible with a sensory capability of the entity, and/or a sensory communication in a format from which or to which the entity, or a user device associated with the entity, is operable to translate. A sensory communication in a format that is compatible with a sensory capability of the entity may be envisaged as a sensory communication that the entity is able to produce or process directly. A sensory communication in a format from which or to which the entity, or a user device associated with the entity, is operable to translate may comprise a communication in a language that is common to both entities (or both user devices if both entities are human users).

The step 220 of obtaining a trained ML model operable to map an input sensory communication in accordance with one of the first or second profiles to an output sensory communication in accordance with the other of the first or second profiles may comprise obtaining, from a repository, a candidate set of at least one trained ML model operable to map an input sensory communication in accordance with one of the first or second profiles to an output sensory communication in accordance with the other of the first or second profiles in step 220c. Step 220 may further comprise selecting, from the candidate set, an ML model for use in translation of communication between the first and second entities in step 220d. Model selection at step 220d can be performed by a translation node located in a user device or computing system, or by a model management node of the translation system, which may for example be hosted in a cloud or edge cloud deployment.

Selecting an ML model from the candidate set may comprise selecting using feedback provided for ML models in the candidate set from users of the ML models. The provision of feedback is discussed in further detail below. Using feedback for selection may include rules-based processes, for example selecting the ML model from the candidate set with the highest feedback, or may make use of an ML model for selection. For example, selection may use a contextual bandit, RL model or other decision-making model, and may seek to maximize expected future positive feedback through improved translation model selection.

Selecting an ML model from the candidate set may further comprise selecting using the obtained context. In the case for example of a second entity comprising a computing system, the computing system may be operable to perform a range of tasks (which may be included in the computing system profile), and different ML models may have different feedback ratings (discussed in detail below) according to the different tasks. Using the context to select an ML model may consequently ensure selection of the most appropriate model for the task to be achieved. In the case of user to user communication, the range of possible tasks, and the variation in performance of different available ML models for those tasks, may be even greater. Further, if the context includes environmental data, different sensory communication capabilities may be more suited to different environments or environmental conditions, and step 220d may consequently select an ML model for translation between sensory communications requiring capabilities that are both available to the relevant one of the first and second entities, and are the best adapted to the current environmental conditions.

Figure 2C:
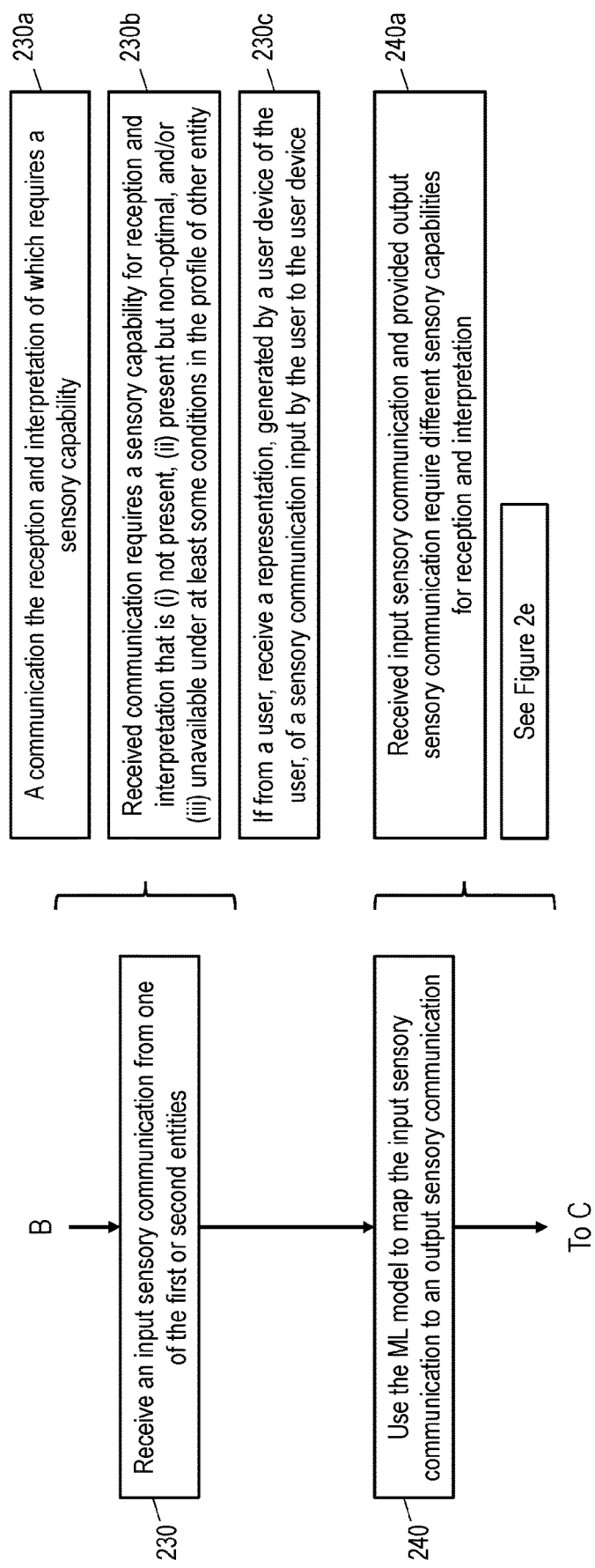

Referring now to FIG. 2c, in step 230, the translation system receives an input sensory communication from one of the first or second entities. As discussed above, and illustrated at 230a, a sensory communication comprises a communication the reception and interpretation of which requires a sensory capability. As illustrated at 230b, the input sensory communication may require a sensory capability for reception and interpretation that is:
(i) not present in the profile of the entity to which the output sensory communication is provided,
(ii) identified in the profile of the entity to which the output sensory communication is provided as non-optimal under at least some conditions, and/or
(iii) identified in the profile of the entity to which the output sensory communication is provided as unavailable under at least some conditions.

A capability that is identified in a profile as non-optimal may include a partial capability, for example if the capability is not consistent with a minimum assumed level, or if under certain environmental conditions the capability should not be relied upon. Non-optimal may also include a non-dominant capability, a capability that is indicated as low preference for the entity, etc. Thus, a human user who is partially sighted, or for whom vision is not the dominant sensory capability may reflect this in their profile by identifying visual sensory capability as non-optimal. In another example, a user who is color blind may be perfectly capable of reading text on a screen but unable to distinguish between messages conveyed entirely by color, such as at a traffic light. In such circumstances, examples of the methods 100, 200 may be used to translate this visual communication that the user is unable to interpret to an audio communication. The output sensory communication in this example may include signals for an audio message to be generated by a user device of the user (for example their smartphone), which will inform the user of the color of the light, or its meaning in the context of traffic control (wait at the line, clear to proceed, etc.)

A sensory capability that is unavailable under at least some conditions may include sensory capabilities that cannot be relied upon under certain conditions (extreme cold, low lighting etc.), or which it may be desirable to replace under certain circumstances, for example if a user wishes to anticipate a future sensory experience. Anticipation of future sensory experiences may be helpful for example if a user wishes to have an idea of the taste of a certain food without actually consuming the food, or to understand how a sound will be experienced under different conditions (different ambient noise, different distances from the source of the sound, etc.)

As illustrated at 230c, if the input sensory communication is received from an entity comprising a user, then receiving the input sensory communication may comprise receiving a representation, generated by a user device of the user, of a sensory communication input by the user to the user device. Thus in some examples raw input from a user may be provided to their own personal user device, and the user device may then send a representation of this raw input for translation (if translation is not carried out at the user device). A user device may consequently be adapted to the particular communication requirements of the relevant user (offering interaction via Braille, voice control, sign language, visual cues, large typeface, large buttons or other input actuators that do not require fine motor control, etc.)

In step 240, the translation system uses the ML model to map the input sensory communication to an output sensory communication. As illustrated at 240a, the received input sensory communication and the output sensory communication to which it is mapped may require different sensory capabilities for reception and interpretation. Sub-steps which may be carried out in order to use the ML model in step 240 are illustrated in greater detail in FIG. 2e.

Figure 2D:
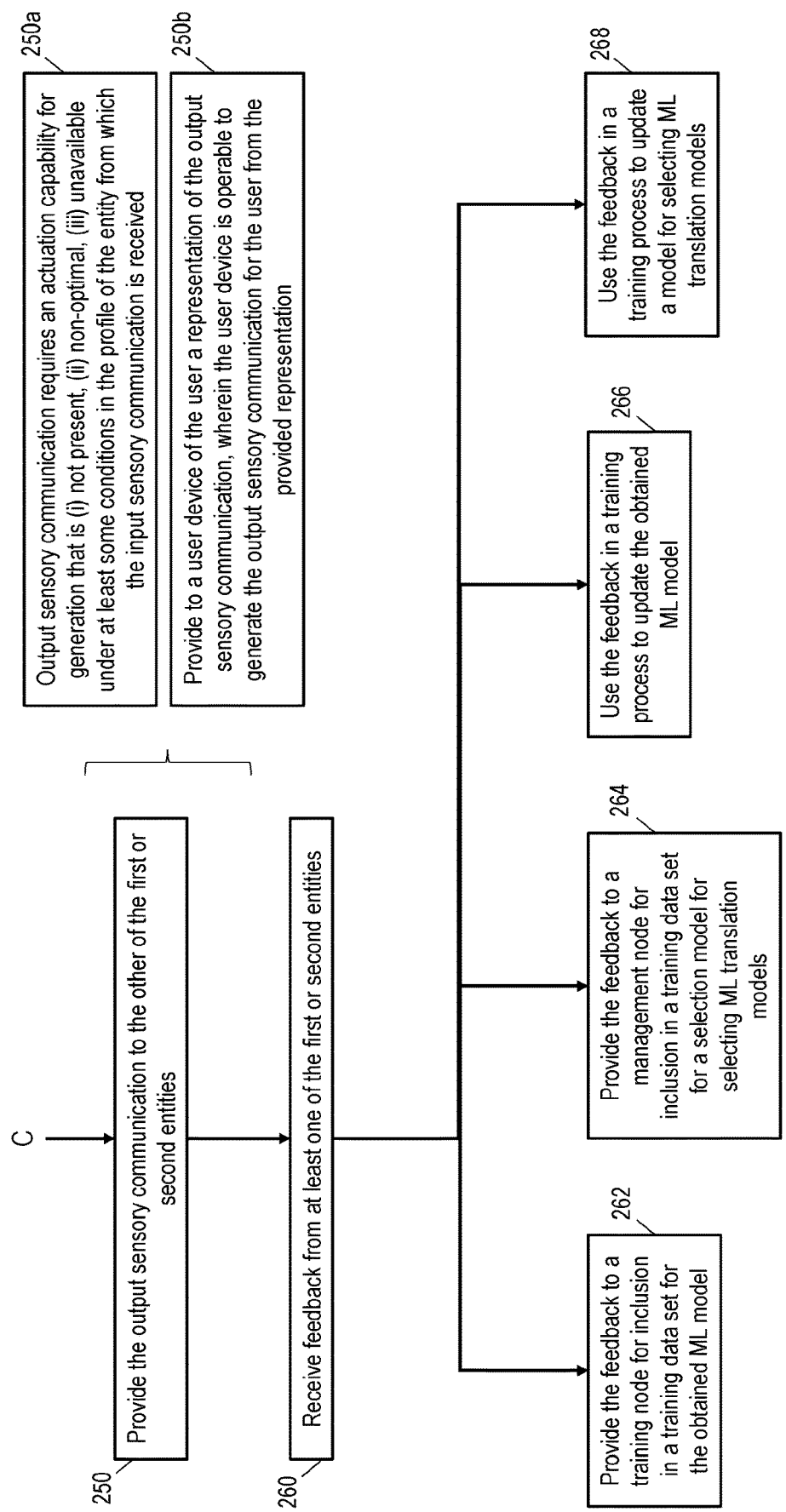
Figure 2E:
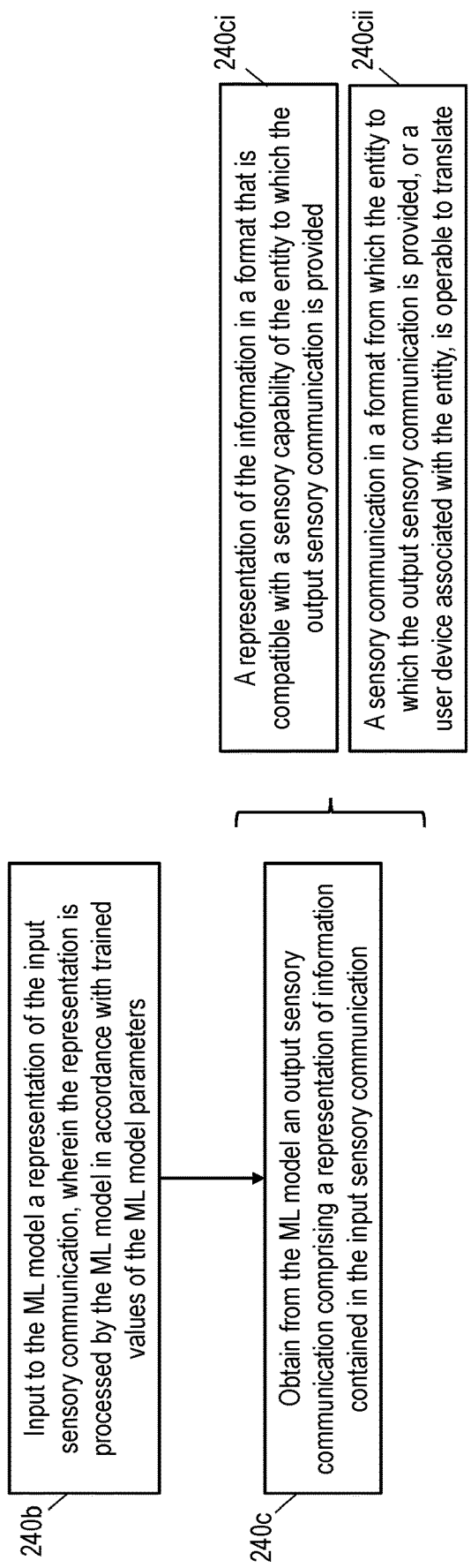

Referring now to FIG. 2e, using the ML model at step 240 may initially comprise inputting to the ML model a representation of the input sensory communication in step 240b, wherein the representation is processed by the ML model in accordance with trained values of the ML model parameters. Using the model may further comprise, at step 240c, obtaining from the ML model an output sensory communication comprising a representation of information contained in the input sensory communication. As illustrated in FIG. 2e, the representation of information contained in the input sensory communication may comprises at least one of:
a representation of the information in a format that is compatible with a sensory capability of the entity to which the output sensory communication is to be provided (240ci); and/or
a sensory communication in a format from which the entity to which the output sensory communication is to be provided, or a user device associated with the entity, is operable to translate (240cii).

Referring back to the description of step 220b, the representation of information contained in the input sensory communication may thus be such that the entity to which it is provided is able to process or interpret the representation directly, or may be in a language that is common to both entities (or both user devices if both entities are human users), and from which the entity to which it is provided is operable to translate directly.

Referring now to FIG. 2d, and following the step 240 of using the obtained ML model to map the input sensory communication to an output sensory communication, the translation system then provides the output sensory communication to the other of the first or second entities in step 250. As illustrated at 250a, the output sensory communication provided to the other of the first and second entities may require an actuation capability for generation that is:
(i) not present in the profile of the entity from which the input sensory communication is received,
(ii) identified in the profile of the entity from which the input sensory communication is received as non-optimal under at least some conditions, and/or
(iii) identified in the profile of the entity from which the input sensory communication is received as unavailable under at least some conditions.

Reference is made to the description of step 230b for a discussion of examples when capabilities may be non-optimal or unavailable under certain circumstances. For example, it may be envisaged that a user with severe arthritis may be unable to manipulate the input interface of an automated machine, and consequently unable to generate a sensory communication that the machine can detect and interpret. In such an example, the user may generate an input sensory communication using a personalized user device that is adapted to their actuation capabilities, and that communication may be translated using examples of the method 100, 200 to a sensory communication that the machine is able to detect and interpret. In another example, an automated machine may have a touch screen input that becomes difficult to use in very wet or cold conditions. In such circumstances, a user may use voice control to generate an input communication to their user device, which may in this example be a smartphone, and that communication can be translated using examples of the present disclosure to a communication that the automated machine can detect and interpret.

As illustrated at 250b, it the other of the first or second entities (to which the output sensory communication is provided) comprises a user, then providing the output sensory communication to the user may comprise providing to a user device of the user a representation of the output sensory communication, wherein the user device is operable to generate the output sensory communication for the user from the provided representation. Thus for example if the user is blind and is interacting with a machine that does not have a speaker, the users' device may receive a digital signal which it will play as an audio message over a speaker. Alternatively, the user device may display the message using Braille. The user device may consequently be generic (such as a smartphone) or may be personalized to the user and their communication capabilities.

In step 260, the translation system may receive feedback from at least one of the first or second entities. The feedback may be objective (for example time taken to download the selected ML model, user response time etc.), or subjective (for example a user quality rating regarding the user experience of the communication with the other entity facilitated by the translation provided by the ML model). The translation system may then performing at least one of steps 262, 264, 266 and/or 268, according to whether or not the translation system is responsible for maintaining and/or training the ML translation models and/or a model for selecting an ML translation model.

In step 262, the translation system provides the received feedback to a training node for inclusion in a training data set for the obtained ML model. In step 264, the translation system provides the received feedback to a management node for inclusion in a training data set for a selection model for selecting ML models for translating a sensory input to a sensory output for communication between first and second entities. In step 266, the translation system uses the received in a training process to update the obtained ML model. In step 268, the translation system uses the feedback in a training process to update a model for selecting ML models for translating a sensory input to a sensory output for communication between first and second entities.

It will be appreciated that some interactions between entities may involve only a single, unidirectional communication. A color blind person respecting a traffic light is an example of such an interaction, in which the communication is one way from the automated traffic light to the user, with no acknowledgement or return communication from the user to the traffic light required. In other examples, bidirectional communication between the first and second entities may be required in order to complete a given task, such as obtaining cash from an ATM, obtaining a boarding pass, paying for shopping, etc. This bidirectional communication may comprise the exchange of a plurality of messages back and forth. In such examples, the steps of the method 100, 200 may be repeated multiple times, with the directionality of communication alternating between receipt of input communication from the first entity and provision of output communication to the second entity, and receipt of input communication from the second entity and provision of output communication to the first entity. In such examples, the translation system may omit the obtaining of profiles, context, and ML model in subsequent iterations of the method, and proceed directly to receipt of new input communications for mapping and provision until the interaction is complete. It will be appreciated that in such bidirectional communication, a single translation node of the translation system may handle mapping of sensory communications in both directions, or separate instances of translation nodes may be present in each of the first and second entities (or user devices), each handling mapping of sensory communications in a single direction.

The methods 100, 200 may be complemented by a method 300 performed by a training node. As for the translation nodes of the translation system, the training node may be a physical or virtual node, and may for example be hosted in a cloud, edge cloud or fog deployment.

Figure 3:
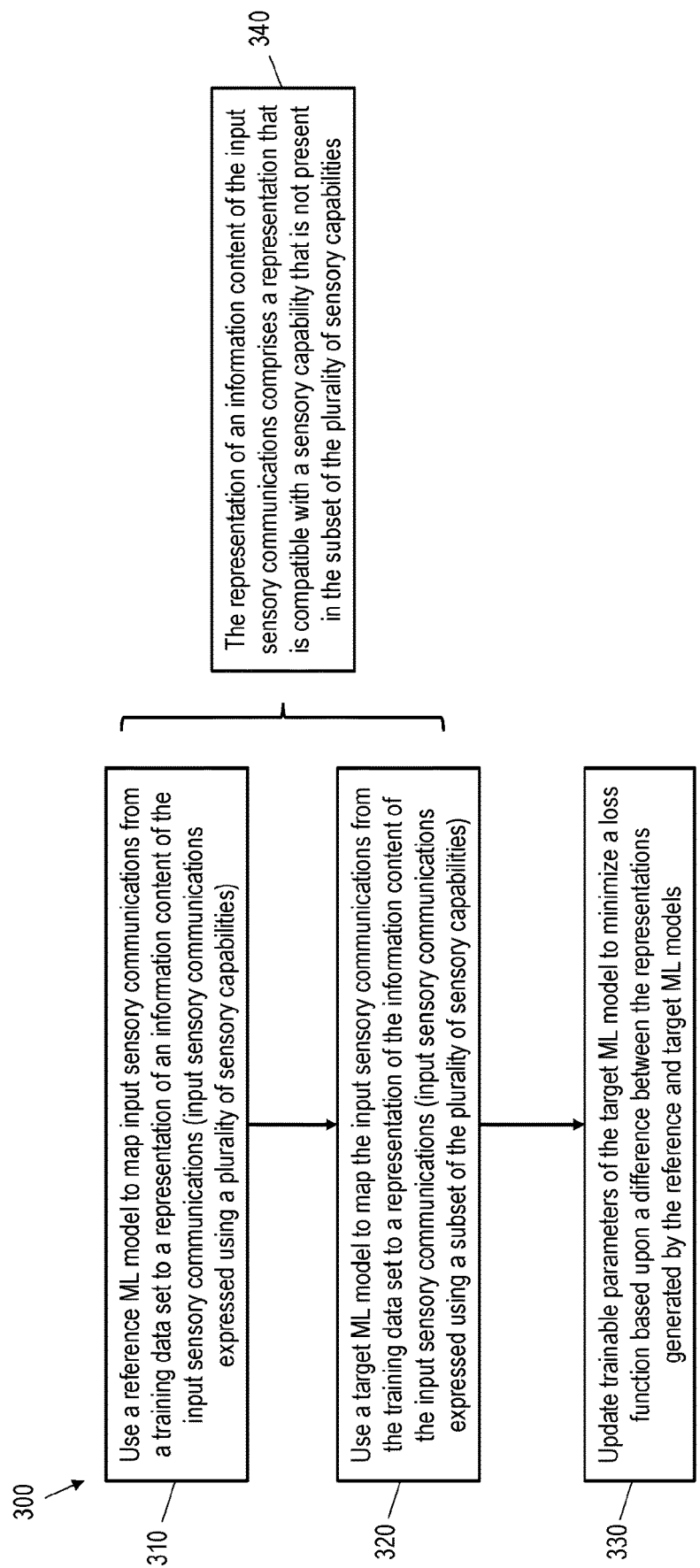
FIG. 3 is a flow chart illustrating process steps in a computer implemented method for training an ML model to map a sensory input to a sensory output.

FIG. 3 is a flow chart illustrating process steps in a computer implemented method 300 for training an ML model to map an input sensory communication in accordance with a first communication capability to an output sensory communication in accordance with a second communication capability. The ML model is for use in translating a sensory input to a sensory output for communication between first and second entities, wherein the first entity comprises a user and the second entity comprises a user or a computing system.

Referring to FIG. 3, in a first step 310 of the method 300, the training node uses a reference ML model to map input sensory communications from a training data set to a representation of an information content of the input sensory communications; wherein the input sensory communications are expressed using a plurality of sensory capabilities. In step 320, the training node uses a target ML model to map the input sensory communications from the training data set to a representation of the information content of the input sensory communications; wherein the input sensory communications are expressed using a subset of the plurality of sensory capabilities. Finally in step 330, the training node updates trainable parameters of the target ML model to minimize a loss function based upon a difference between the representations generated by the reference and target ML models. As illustrated at 340, the representation of an information content of the input sensory communications (that is the output of the reference and target ML models) comprises a representation that is compatible with a sensory capability that is not present in the subset of the plurality of sensory capabilities. The target ML model is thus operable to receive an input in which one or more sensory capabilities that are available to the reference ML model are missing. The target ML model converts this input to an output that effectively replaces the missing input sensory capabilities.

FIGS. 1 to 3 discussed above provide an overview of methods which may be performed according to different examples of the present disclosure. These methods may be performed by different examples of translation system and training node, as illustrated in FIGS. 14 to 17 below. There now follows a detailed discussion of functionality that may be present in such systems and/or nodes, and of how different process steps illustrated in FIGS. 1 to 3 and discussed above may be implemented.

In one example, the translation system carrying out the methods 100, 200 may be implemented in an architecture comprising a user device, also referred to as a Personalized User Equipment (PUE), and a Model Repository in which ML translation models are stored. The PUE may be a standard smartphone or may be an equipment that is customized to the user's communication capabilities, such that the user can interact with the PUE regardless of the type and functionality of any machine they are interacting with, or the capabilities of another user with whom they are interacting. The Android Switch functionality is an example of a hybrid customization of a smartphone for differently abled users. A PUE may alternatively function using a joystick, gamepad, or any other interface adapted to the particular user, including for example a personalized hardware keyboard with an alphabet of choice. A PUE may include personalized disability equipment that is specially designed for the user profile. If not inbuilt, the network interface for a PUE device (for example Bluetooth, radio access, WiFi, etc) should preferably be easily attached to these devices (Plug&Play functionality) allowing the PUE to communicate and interact with serving machines. The translation system comprises the translation nodes which may be implemented in one or more of a PUE and/or computer system of an automated machine. Interaction between entities according to the methods 100, 200 may be interaction between two human users or between a user and a machine.

Figure 4:
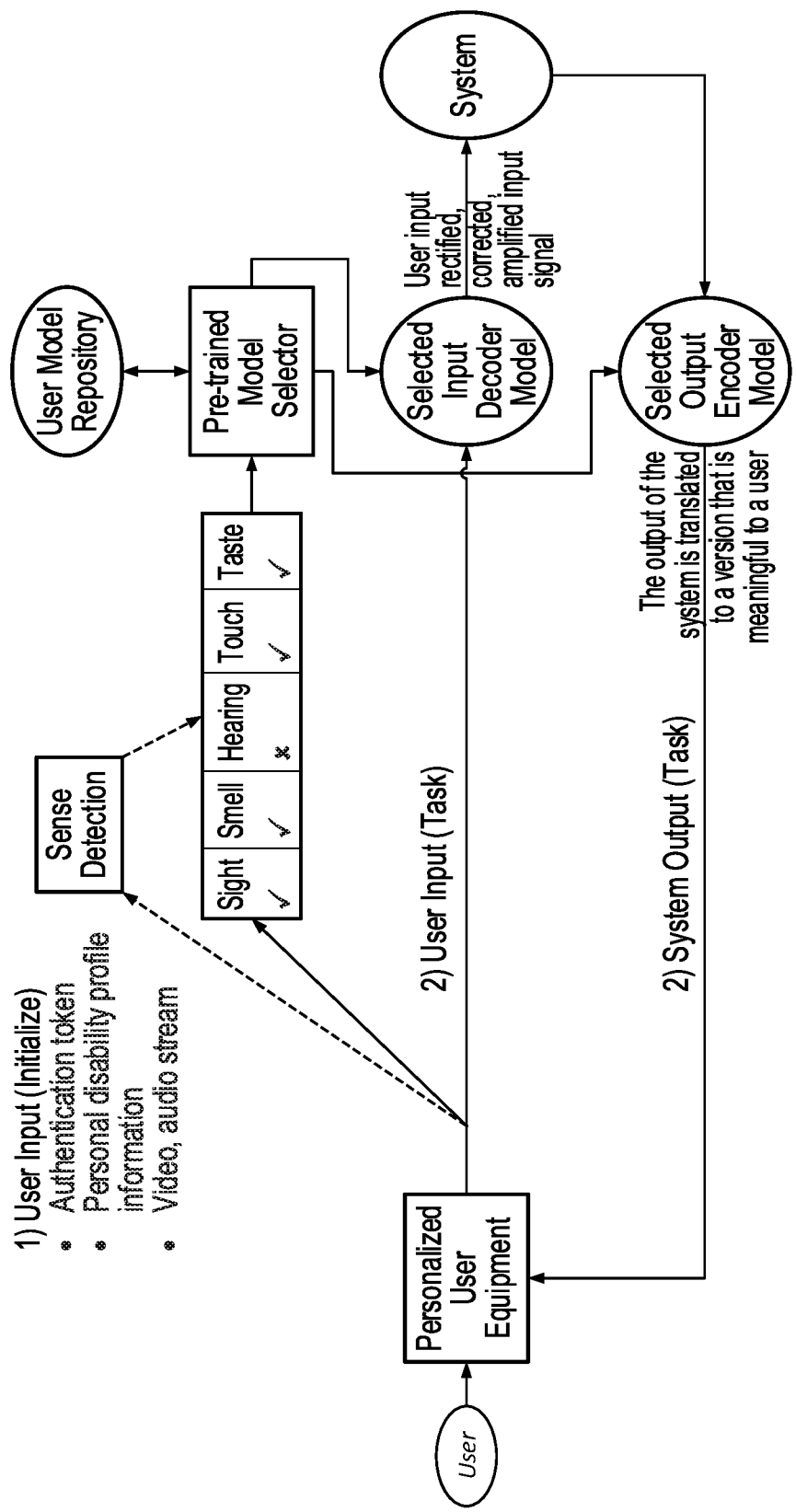
FIG. 4 illustrates an overview of a bidirectional communication according to an example architecture.

FIG. 4 illustrates an overview of a bidirectional communication according to the example architecture discussed above and an implementation of one or more of methods 100, 200. It will be appreciated that the communication between the first and second entities (in this case a human user and an automated system) may be implemented via direct translation between the entities or indirect translation in between the entities when there exists a common language interface between them.

Referring to FIG. 4, during an initial setup phase, a user profile (including user communication capabilities) is obtained, and the user is authenticated. A user carries a device, which may be personalized, and with which the user is comfortable interacting. The user device is compatible with the user's communication capabilities, and it is this device that the user will use to interact with any automated machine or system, for example for buying food or other items, making payments, obtaining parking tickets, etc. The user device may communicate with any serving device over any suitable interface including for example Bluetooth, WiFi, a radio interface, etc. Once a connection is established between the user device and the serving machine, the user profile is then shared with the machine, together with a user token. The user token may be used to authenticate the user. Authentication may also make use of one or more sensors attached to, or at least in communication with, the serving machine or its translation node. For example, a camera in communication with the machine may verify one or more identifying features of the user as set out in the authentication token. Authentication and provision of user profile including communication capabilities can also be performed using an RFID tag. In some examples, information about user communication capabilities may be detected by the one or more sensors in communication with the serving machine. In such examples, one or more confirmatory tests or other actions may be performed by the user to enable the machine, via the sensors, to detect elements of the user profile relating to the user's communication capabilities.

Following setup, direct translation between the entities can be performed either entirely at one entity (a single translation node located in either the machine system or in PUE), or can be performed at both entities. The model repository and the model selection mechanism can also be either within the PUE or in the serving machine, or in another location, for example hosted in a cloud deployment.

Figure 5:
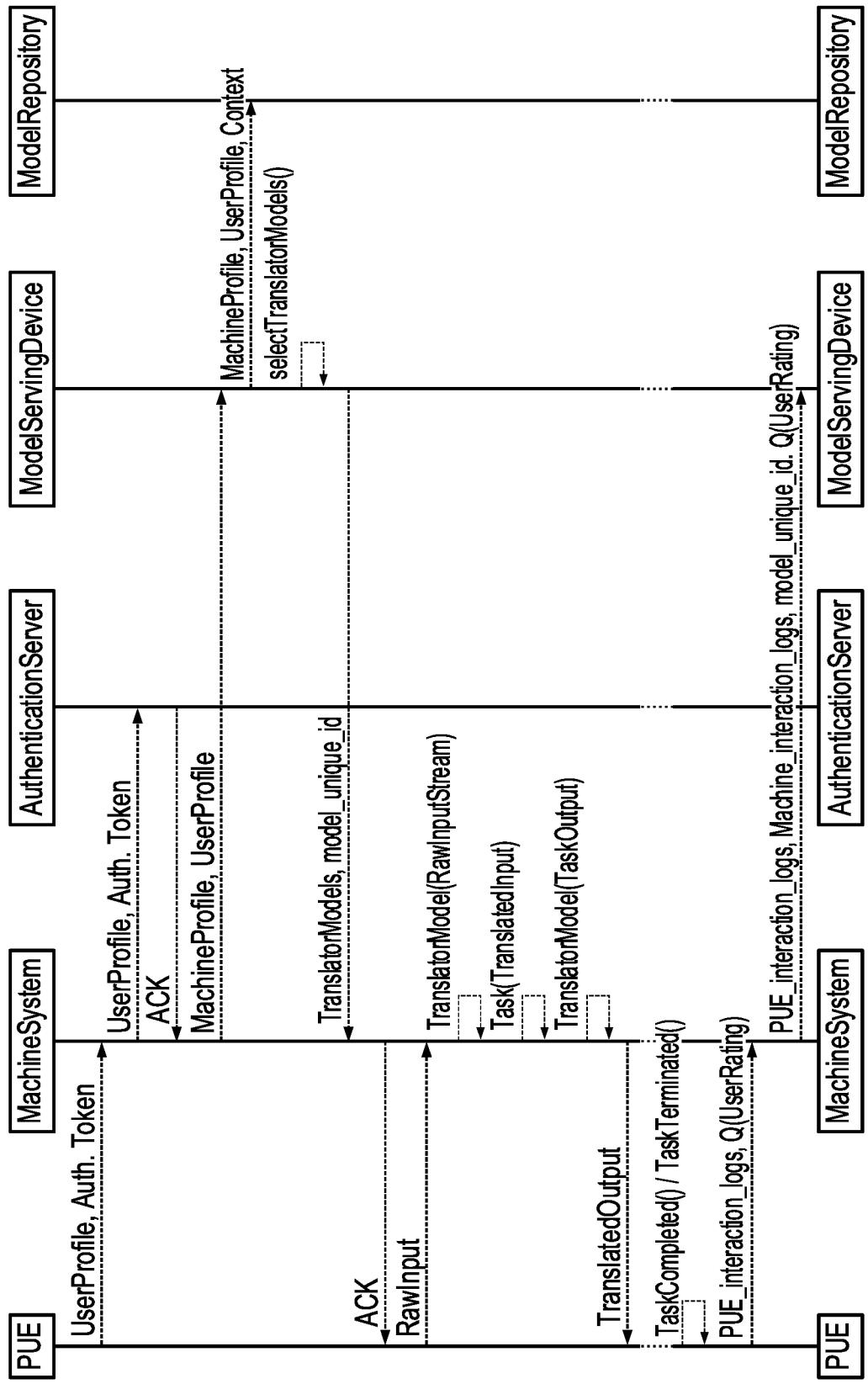
FIG. 5 illustrates a signaling exchange for translation of sensory communications at a machine system entity.

A signaling exchange for translation at the machine system entity is illustrated in FIG. 5. According to the example of FIG. 5, a translation node is located in the machine system, performing the actions illustrated as performed by the machine system. A model management node of the translation system comprises a model serving device and model repository, as illustrated in FIG. 5. The signaling flow of FIG. 5 may be appropriate for example in situations in which a translator node in the PUE of the user is not able directly to access the model repository. Referring to FIG. 5, the user profile and authentication token are received by the machine system, and the user is authenticated via authentication server. Following authentication, the machine and user profiles are provided to the model management node (model serving device). The model serving device also makes use of a communication context to obtain, from the model repository, an appropriate ML translator model. After acknowledging the user profile and authentication token from the user, the machine system then receives an input communication, which the machine system (translator node) maps to a communication that the machine system is operable to interpret. This exchange comprises a first communication from the user to the machine. The machine system then processes this mapped communication and produces a communication output. The communication output is processed by the translation node as a new input communication for mapping to a format compatible with the user profile. The translator node consequently translates the communication output to a format compatible with the user (for example interpretable by the user or the user device), and provides the translated output to the user device. The machine system may then receive user feedback on the interaction, which feedback may be provided to the model serving device for use in future model selection. It will be appreciated that the signaling exchange illustrates a situation in which a common language between the user device and machine system may not exist, and translation between communications compatible with the user and communications compatible with the machine are performed as an end-to-end pair.

Figure 6:
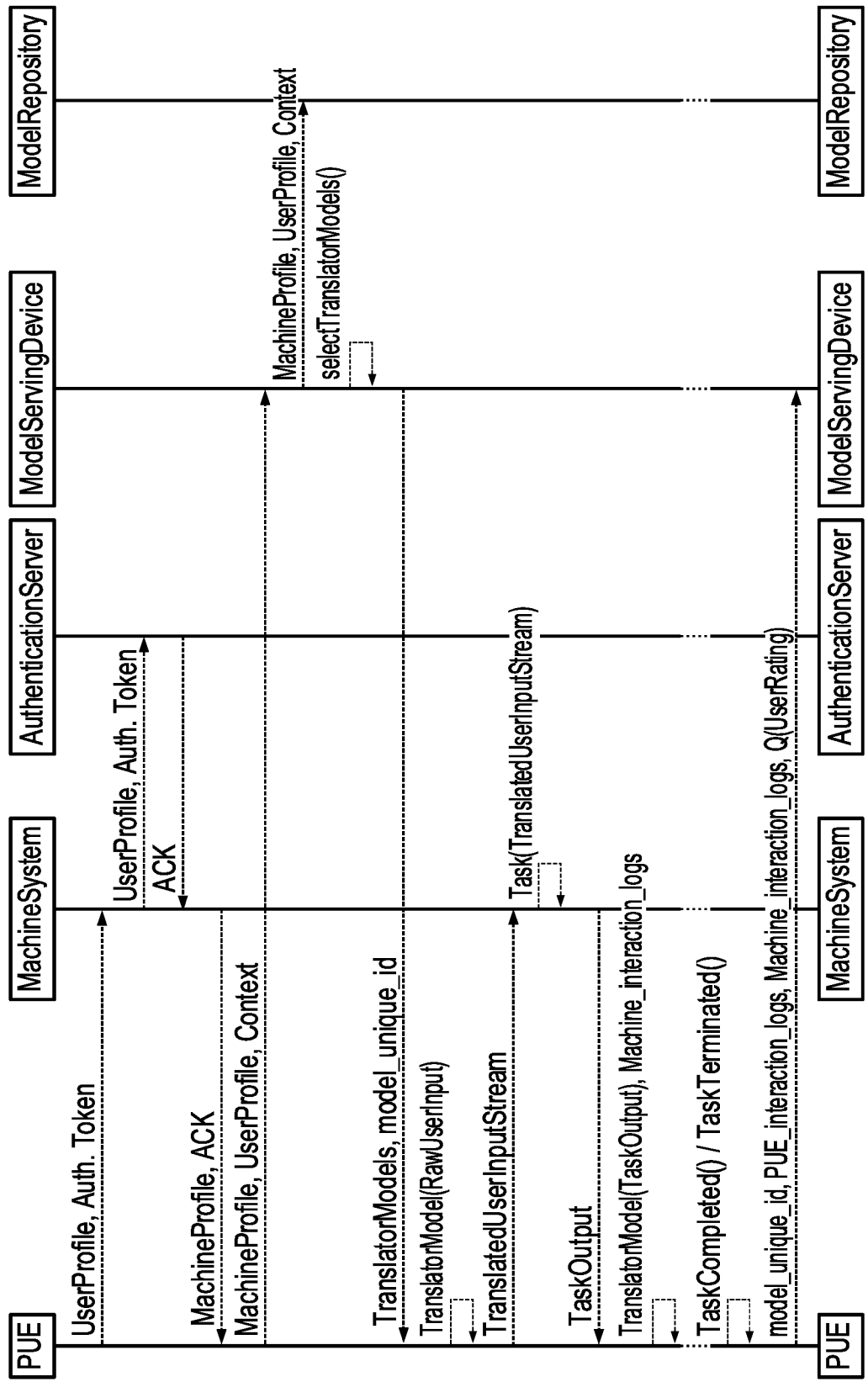
FIG. 6 illustrates a signaling exchange for translation of sensory communications at a user entity.

A signaling exchange for translation at the user entity (using the user device or PUE) is illustrated in FIG. 6. If the model repository is accessible from the PUE, then a translation node at the PUE can handle mapping of outgoing communications from the user and incoming communications from the machine system, following authentication by the machine system of the user, as illustrated in FIG. 6. As for FIG. 5, it will be appreciated that the signaling exchange of FIG. 6 illustrates a situation in which a common language between the user device and machine system may not exist, and translation between communications compatible with the user and communications compatible with the machine are performed as an end-to-end pair.

A hybrid signaling exchange may also be envisaged, in which translation takes place at both entities, with a translation node residing at each entity (for example at the user device in the case of an entity comprising a human user). Translation at each entity may make use of a common language model, with an ML model at each entity serving as an interface between the entity and the common language. The input communication from one entity is converted to the common language for provision to the other entity, at which the common language is then converted to a final output which can be interpreted by the other entity. This exchange may be bi-directional so that a response from the destination entity of the first communication can be converted to the common language for transfer and then back to the language that the source entity can interpret. The ultimate aim of the ML models used to map to and from the common language is to render the translation as interpretable and actionable as possible, that is to render the translation meaningful to the entities. A user rating of the translation, or of the overall communication experience, may be collected. This rating may provide a quality score based on the subjective experience of the user during their interaction with the machine via the translation system.

Figure 7:
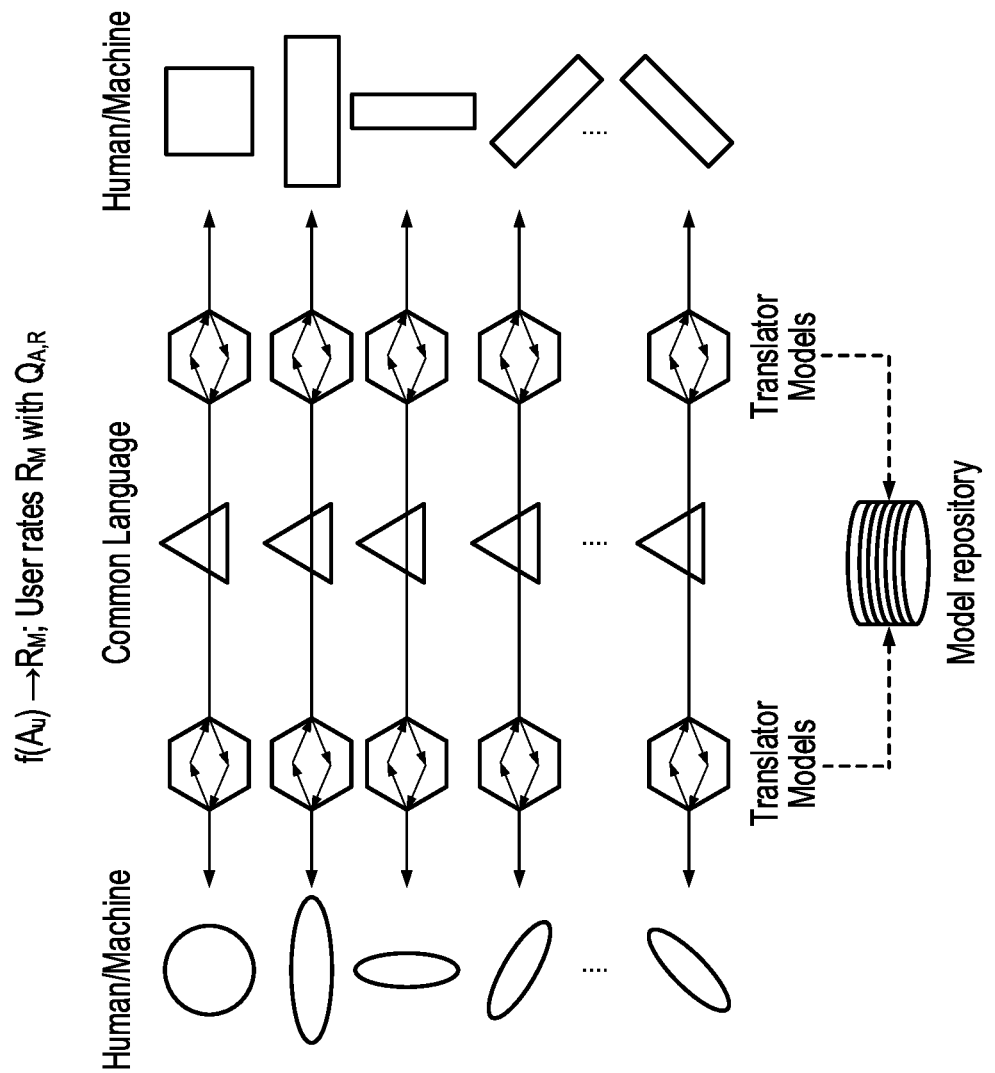
FIG. 7 illustrates translation via a common language.

Translation via a common language is illustrated in FIG. 7. The ML model performing translation from an input user communication is represented by a function f(Au), where the Au is the action, A of the user, u. In response, the user experiences RM, which is the reaction, R from the system, M. At the end of task completion (end of the interaction), the user rates the perceived quality of responses received from the system. The user may consider any aspect of their Quality of Experience (QoE) in rating the system, representing their general degree of satisfaction with the experience of using the machine. The user may for example consider the response time of the machine, usefulness of the machine, together with context information for the interaction, (which may have been previously recorded). Gradually, ML models for translation may be ranked according to user rating, allowing for those models with high ranking to be prioritized over similar models that are designed or trained to serve the same task. Poorly rated models may be replaced. A table illustrating this information from communication context and user ratings is illustrated in FIG. 8.

Figure 9:
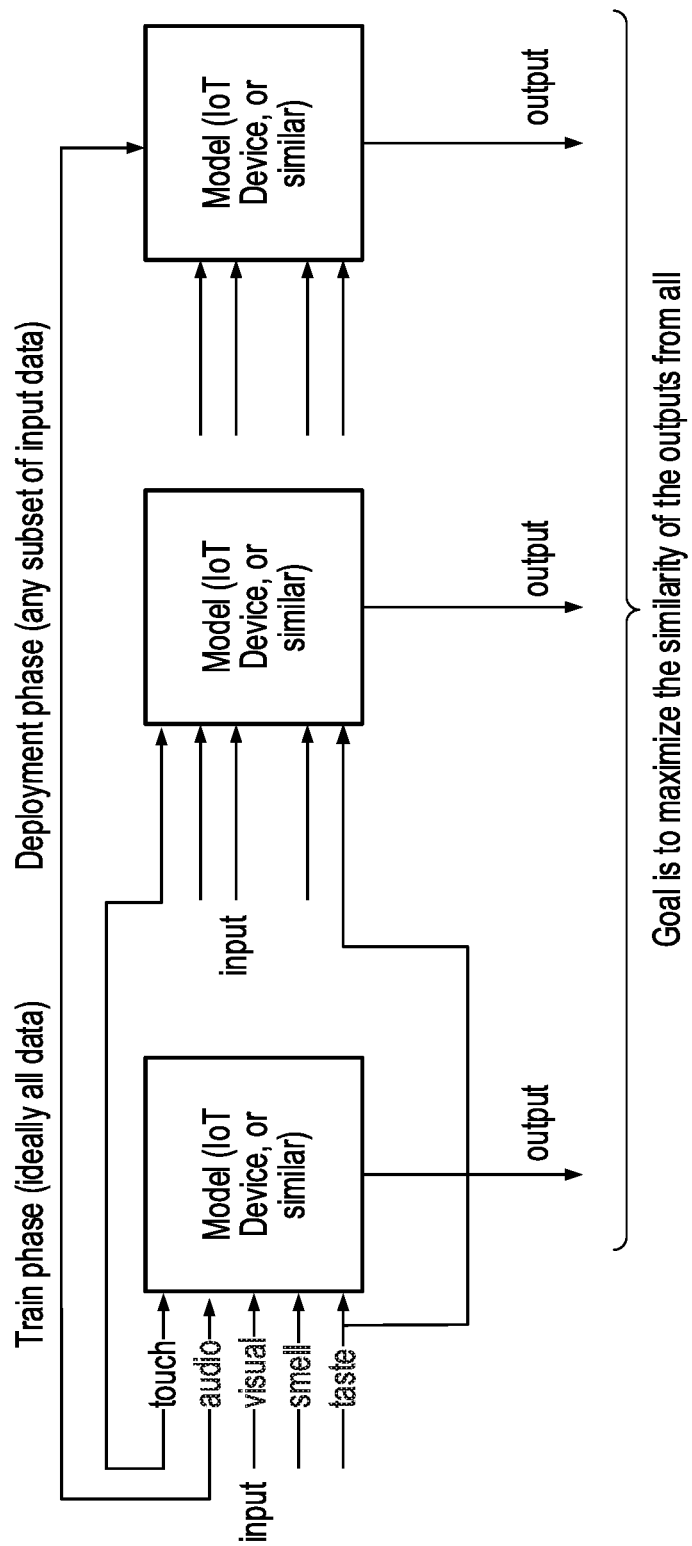
FIG. 9 illustrates one example of training and deployment of ML models for translation between a sensory input and a sensory output

FIG. 9 illustrates one example of training and deployment of ML models for translation between a sensory input and a sensory output. For an interaction between a human user and a machine, the aim is to convert subjective experiences into a machine understandable form, and to convert the machine language to a human interpretable form. Translator ML models can perform this function in a bidirectional manner. Such models can be personalized and trained with pre-collected user opinions, such as feedback on a sensed object, and the corresponding objective measurements from electronic sensors. In the case of missing senses, and missing actuators, those pre-trained models can assist in translation.

In deployment, a user does not need to provide explicit additional subjective feedback but can rely upon the pre-trained ML translator models, together in some examples with additional sensors such as cameras, microphones etc. A user can however choose to provide feedback that will be added to a training data set for updating the model, and can also be used to assess user quality of experience. In one example, translator ML models can be trained using horizontal federated learning. Collected objective translated input/output datasets can be labeled by users indicating the quality of the translator models as a result of the outcome of interaction, therefore contributing to improving the quality of model repository.

The ML translator models are able to map a first sensory communication, which requires a certain sensory capability in order to be detected and interpreted, into a different sensory communication, which contains the same information as the first sensory communication but requires a different sensory capability in order to be detected and interpreted. Thus a visual message can be translated to an audio message for someone with sight impairment, or when ambient light is low, or an audio message can be translated to a visual message for someone with a hearing impairment, or when background noise is very high. Available sensor input and context may also be used as model input to enhance translation, as well as for optimal model selection. Translation may also account for actuation capabilities that may be assumed during machine design but that are not available to a given user, ensuring that a user can generate an input communication using their particular capabilities, and that communication can be translated for interpretation by the machine. In this manner, the machine can respond appropriately to a user demand or other input, and user-machine interaction is facilitated even when communication capabilities of the user that are assumed at the time of design of the machine are not in fact present.

FIG. 9 illustrates how a model may be trained against a reference model. Multiple training and deployment solutions are available, of which the setup of FIG. 9 is an example. The reference model has a full set of sensory inputs and generates an output that is consistent with a particular sensory capacity. It may be assumed that owing to the complete sensory input set, the reference output will be substantially correct. The target model receives a subset of the sensory inputs, representing missing or incomplete sensory capabilities of an entity. The target model aims to produce an output that is as close as possible to the output of the reference model. FIG. 9 illustrates a training technique where different combinations of sensory inputs, corresponding to different combinations of available sensory capabilities, are input into different neural network models (for example via dropout at input layer). The goal of training is to maximize the similarity (or minimize the distance) between the outputs of each model. In this manner, a neural network can function opportunistically with respect to any given subset of input sensory data. It will be appreciated that the fewer sensory capabilities for input the lower the probable accuracy of the model, which may estimate or functioning with poor precision, and may suffer from incorrect actions given by a decision making mechanism. In some cases simple models with a very low number of input features can function satisfactorily, although other techniques can be may improve accuracy. The following techniques are examples that may be suitable for translation models:

Multi-Input, Multi-Output Neural Network Translator Model:

Multi-input multi-output NN models can be used for example with a goal of mapping existing input sensory attributes to missing sensory attributes. Alternatively, a conditional generative model can be used to generate missing attributes from available ones. This option requires the NN model to be trained with each and every scenario, for all combinations of sensor attributes, as the goal of the model is to map any input to any output. Multiple versions (or a random dropout example) of the model should be pre-trained and available in the devices where translation noes will be deployed and used.

Once the model is trained, and depending on the existence of available input features, the weights of the connections from the missing attributes can be set to 0 in deployment.

Figure 10:
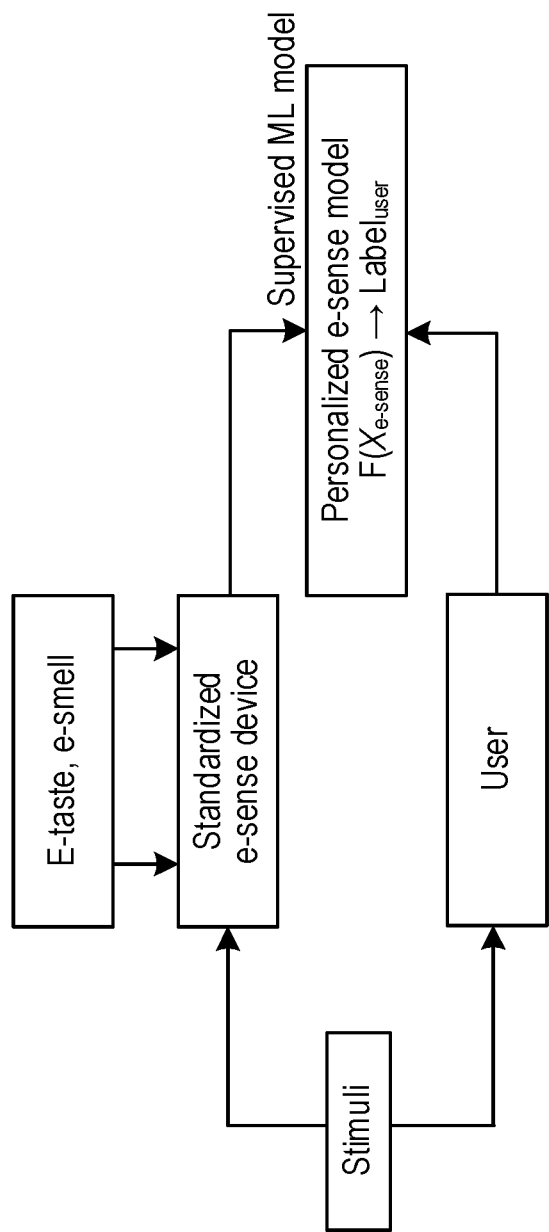
FIG. 10 illustrates a supervised learning model that transforms system input to a user interpretable input.

A supervised learning model that transforms system input to a user interpretable input is illustrated at a high level in FIG. 10. The dataset can be either univariate or multivariate, and the model is trained such that $F(label_{user}) \rightarrow X_{e\text{-}sense}$ Generating Missing Attributes:

In some cases, for example if the sensory attribute set is inter-dependent with cross correlation between attributes, the model may seek to impute missing sensory attributes from those present. In such cases, a suitable generative candidate algorithm is a conditional Variational Autoencoder (VAE). The input to the cVAE includes existing attributes that take contextual information (representation of user context including whether the user is sitting, standing, height, weight, etc.), and conditional variables such as all sensory information received from a user. A cVAE model has the property of grouping representations for the same instance close to each other in the embedding space, which helps to maintain the correlation between all input attributes. Therefore, if the cVAE model in this case is pre-trained with all features in advance, when some attributes are missing, those missing attributes can be regenerated from data points that are located within close proximity in the embedding space. A Generative Adversarial Network (GAN) is another example of a generative model that would be suitable for these cases.

Combination of Generative Models and Contrastive Learning:

Recent advancements in techniques such as XMC-GAN enable image synthesis from text with high accuracy. A string of words or sentences are provided as input to the pre-trained models, and the model yields different images according to the text. For example, if the input sentence is "a living area with a television and a table", then the model generates an image that matches what the sentence is depicting.

Other techniques in the intersection of zero-shot learning and contrastive learning may be suitable candidates for translation models.

In further examples, a model may seek to complement missing features using a vertically partitioned dataset amongst multiple users with a Split Neural Network to recover the missing attributes. This may be particularly appropriate in situations in which multiple users with different sensor input can interact with a system collaboratively, or in which multiple users with complementary sensory capabilities interact with a system (for example to achieve collaborative control of a remote vehicle).

Translator Model Selection

There are various ways to perform translator model selection. One solution can be via content-based filtering, in which each model is associated with a rating based on feedback from users. If similar models with different user ratings (Q) are available, then models with higher ratings can be recommended (or selected) for the matching user profile, machine profile and communication context. Other more complex ways of performing the selection include for example a contextual bandit agent. For a contextual bandit, the observed context would include environmental factors and the user and machine profiles, and the reward is the quality rating received from the user (or alternatively the estimated quality rating from historical observations). The action of the contextual bandit is the selection of the a given translation model (for example the model ID).

The table below illustrates an example scenario in which the profiles of User A, User B, and User C are very similar. The similarity can be computed via various evaluation metrics including cosine similarity, dot product, etc. If both User A and User C have used $Model_{A,A}$ and $Model_{C,A}$ while interacting with Machine A in the past, then the model with the highest rating (i.e., $Model_{A,A}$) can be suggested to User B while interacting with Machine A.

|  | Machine A | Machine B | Machine C | Machine D |
| --- | --- | --- | --- | --- |
| User A | $Model_{A,A}$ Rating = 5/5 | $Model_{A,B}$ | $Model_{A,C}$ | $Model_{A,D}$ |
| User B | X | ↓ $Model_{B,B}$ | $Model_{B,C}$ | $Model_{B,D}$ |
| User C | $Model_{C,A}$ Rating = 2/5 | $Model_{C,B}$ | $Model_{C,C}$ | $Model_{C,D}$ |

Various use cases for the methods disclosed herein have been suggested, and there now follows a more detailed discussion of some example use cases. It will be appreciated that the use cases presented herein are not exhaustive, but are representative of the type of problem which may be addressed using the methods presented herein.

A first class of use cases includes any user-interactive machines that are not customized for a particular user profile, but instead are designed to serve to the mean of all user profiles. This may include for example ATMs, parking meters, automated checkouts, airline check in machines, ticket machines, public information points, etc. Examples of the present information bring personalisation in respect of individual user and machine capabilities, as well as contextual awareness relating to the task to be completed via the interaction between entities, as well as environmental factors. Examples of the present disclosure can be deployed over existing machine hardware and software, enabling personalised interaction with existing legacy systems.

Another class of use cases may include interactions in which it is desirable to replicate, anticipate or in some way represent a sensory experience that is not immediately available to a user. Examples of such use cases includes a machine for ordering food in a grocery store on a Graphical User Interface (GUI) of a food-delivery website, or the tasting menu of a restaurant. A multi-sensory service provided via examples of the methods disclosed herein can offer improved user experience for example in the case of:

a user who would be otherwise unable to interact with the machine/GUI owing to a missing sensory capability;
  a person having deficient senses of taste or smell and wishing to order or cook food, or purchase ingredients;
  a person seeking to choose between unfamiliar food options.

Text about food may not be the most effective way of communicating food characteristics to a user, and an alternative sensory representation, for example encoding information in a different visual format, may enable the user to make a better decision.

The following example considers the senses of smell and taste. Rather than describing the smell or taste of a food that is not immediately available, or the user has a deficient sense of smell or taste, methods according to the present disclosure could present the user with the facial expression of a typical person reacts to this taste. In another example, the learning for an ML model of this type could be performed in a distributed manner, based on a local data set of the user's own face reacting to different tastes and smells. Additional sense information measured via external sensors such as heartbeat, stress, etc. can also be used as well to increase the granularity of the provided representations. For a model using a typical person's reaction, this reaction could be learned generally (regardless of characteristics of the people contributing to the learning) or subject to age group or location (city/country, etc.). A similar idea could be used for adjusting sound volume by a person trying to understand how the sound is experienced by a typical person in a distance of x.

Figure 11:
FIG. 11 illustrates how image recognition algorithms encode facial images by finding reference points.

FIG. 11 shows how image recognition algorithms encode face images by finding reference points, and calculating the relative distance of these points. Any change in the mood of face as a result of tasting a food ingredient or smelling an odor could be learned as the return of that action, which results in training the AI module for representation of the sense in a visual way. Publicly available databases are available providing facial reactions of adults and infants to different tastes. Such databases may be used as training data for translation models, for example to assist adults without a sense of smell or taste in making food choices for their children.

Electronic personalized machine learning models attached to sensors such as e-smell and e-taste can similarly transform sensed information to a meaningful form that might assist consumers or food producers given a level of quality (like/dislike) of a given food product. In this manner, consumers can obtain an estimated taste of a food before they buy it, or producers can taste a food and put it into the market if it passes the expected taste and smell criteria.

In further example use cases, vehicle drivers with certain disabilities may be assisted using examples of the present disclosure. Drivers with colour blindness for example can be assisted by a user device communicating with a connected traffic light. The translation system, for example via a translation node in the user device or the traffic light, can select a suitable ML model to translate a visual image of the traffic light captured by a camera and output an audio signal for the driver in real time.

Collaborative Control of an Environment

Figure 12:
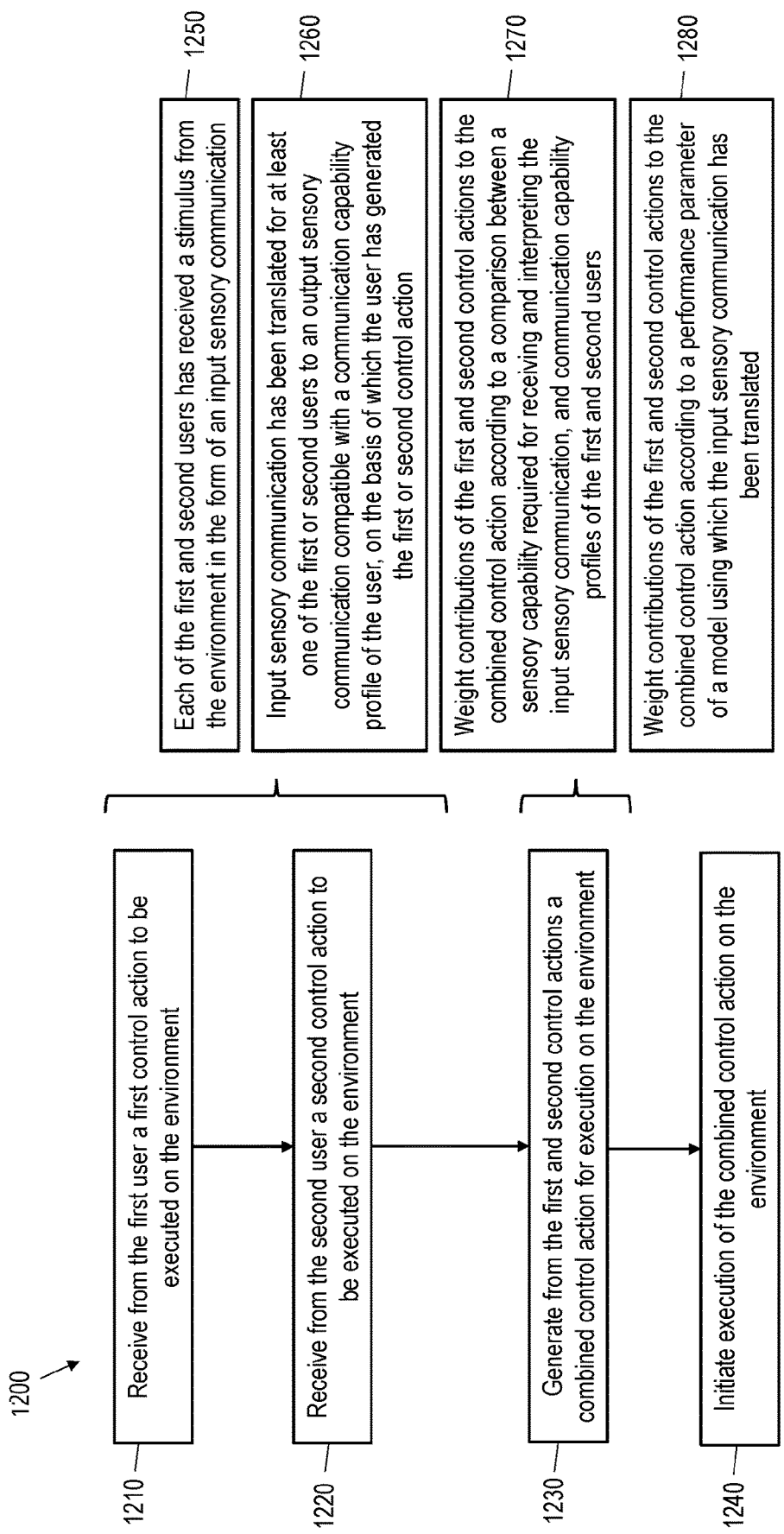
FIG. 12 is a flow chart illustrating process steps in a computer implemented method for facilitating combined control of an environment by first and second users.

According to another aspect of the present disclosure, there is provided a method 1200 for facilitating combined control of an environment by first and second users. As illustrated in FIG. 12, the method 1200, for example performed by a management node, comprises receiving from the first user a first control action to be executed on the environment in step 1210. In step 1220, the management node receives from the second user a second control action to be executed on the environment. As illustrated at 1250, each of the first and second users has received a stimulus from the environment in the form of an input sensory communication. As illustrated at 1260, the input sensory communication from the environment may have been translated for at least one of the first or second users to an output sensory communication compatible with a communication capability profile of the user, on the basis of which the user has generated the first or second control action. The input sensory communication may have been translated for at least one of the first or second users using a method according to the present disclosure.

In step 1230, the method 1200 comprises generating from the first and second control actions a combined control action for execution on the environment. The management node then initiates execution of the combined control action on the environment. As illustrated at 1270, generating a combined control action for execution on the environment may comprise weighting contributions of the first and second control actions to the combined control action according to a comparison between a sensory capability required for receiving and interpreting the input sensory communication, and communication capability profiles of the first and second users. Thus, for example greater weight may be placed on a control action from a user whose communication capabilities were compatible with the input sensory communication. As illustrated at 1280, generating a combined control action for execution on the environment may further comprise weighting contributions of the first and second control actions to the combined control action according to a performance parameter of a model using which the input sensory communication has been translated.

In some examples of the method 1200, additional processes may be introduced to preserve safe functioning of the controlled environment. For example, the method 1200 may include the step of checking a certainty level associated with any one of more of the first, second and combined control actions. The method 1200 may additionally or alternatively include the step of checking that any one or more of the first, second and combined control actions are meaningful given a current state of the environment, context for the combined control, and/or the stimulus received by the first and second users from the environment in the form of an input sensory communication. If either of these checks is unsuccessful (insufficient certainty or a non-meaningful action), then the method 1200 may comprise taking one or more actions to preserve safe functioning of the environment. Such actions may include stopping operation of the environment or any apparatus within the environment, pausing such operation, reducing a speed or any other managed variable, or any other action to allow time for resolving uncertainty, regenerating a combined control action, checking stimuli received form the environment, or otherwise recovering the situation. In some examples, these additional steps for the preservation of safe functioning of the controlled environment may apply only to certain functionality, operations, or decisions, including critical or mission-critical functionality, operations or decisions, which may be universal or may be specific to a particular use case, and may for example be designated or identified by a domain expert.

Figure 13:
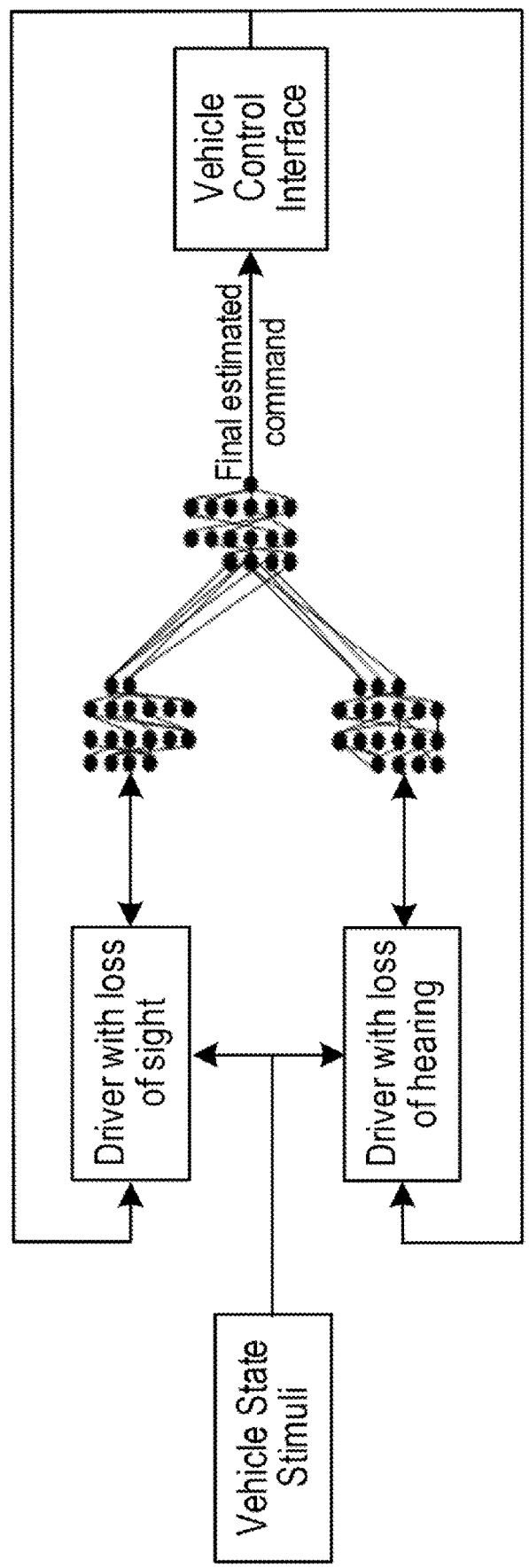
FIG. 13 illustrates collaborative control according to an example of the method of FIG. 12.

An example of collaborative control that may be achieved using the method 1200 might include combined control of a remote vehicle, for example in an industrial setting such as a mine or other hazardous environment, as illustrated in FIG. 13. The method may enable combining of multiple orthogonal user models that potentially complement each other given a context. For drivers with certain disabilities, for example where the drivers' communication capabilities complement each other, a vehicle can be driven by multiple drivers with disabilities simultaneously (for example a first driver having hearing disorder and a second driver with loss of sight). With the combination of their input simultaneously, and using for example split Neural Networks, the two drivers can give ensembled instructions to a remote neural network that can blend the inputs to finalize the commands given to the vehicles. The "blending" may be performed by separate neural network model, which may for example concatenates the output of the two neural networks, and then train the weights of the neural network to finally map the concatenated outputs to a label that is obtained with consensus during a pretraining phase. The decision of the model for different input and output scenarios (with different stimuli) can be labeled/evaluated by the drivers collaboratively so as to decrease conflicts over time.

As discussed above, the methods 100 and 200 may be performed by a translation system, and the present disclosure provides a translation system that is adapted to perform any or all of the steps of the above discussed methods. The translation system may comprise one or more physical nodes such as a computing device, server etc., or may comprise one or more virtual nodes. A virtual node may comprise any logical entity, such as a Virtualized Network Function (VNF) which may itself be running in a cloud, edge cloud or fog deployment. One or more nodes of the translation system may for example comprise or be instantiated in any part of a communication network node such as a logical core network node, network management center, network operations center, Radio Access node etc. Any such communication network node may itself be divided between several logical and/or physical functions.

Figure 14:
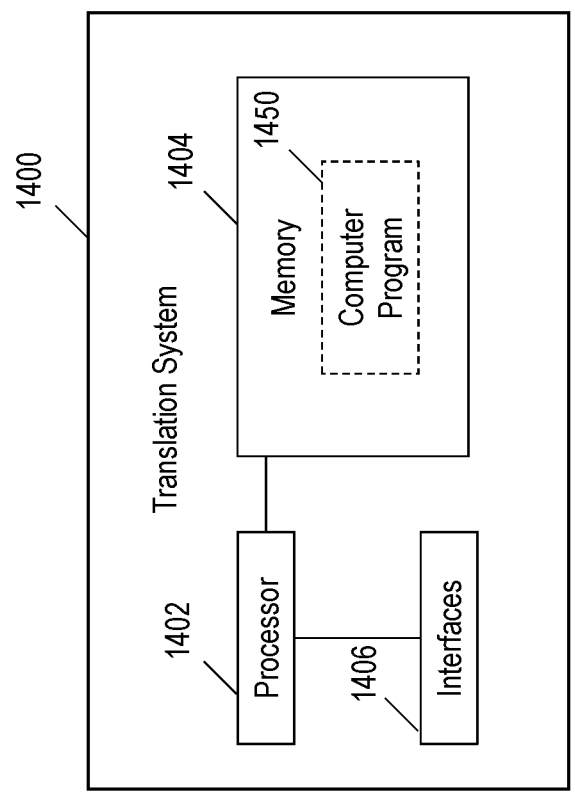

FIG. 14 is a block diagram illustrating an example translation system 1400 which may implement the method 100 and/or 100, as illustrated in FIGS. 1 to 2e, according to examples of the present disclosure, for example on receipt of suitable instructions from a computer program 1450. Referring to FIG. 14, the translation system 1400 comprises a processor or processing circuitry 1402, and may comprise a memory 1404 and interfaces 1406. The processing circuitry 1402 is operable to perform some or all of the steps of the method 100 and/or 200 as discussed above with reference to FIGS. 1 to 2e. The memory 1404 may contain instructions executable by the processing circuitry 1402 such that the translation system 1400 is operable to perform some or all of the steps of the method 100 and/or 2600, as illustrated in FIGS. 1 to 2e. The instructions may also include instructions for executing one or more telecommunications and/or data communications protocols. The instructions may be stored in the form of the computer program 1450. In some examples, the processor or processing circuitry 1402 may include one or more microprocessors or microcontrollers, as well as other digital hardware, which may include digital signal processors (DSPs), special-purpose digital logic, etc. The processor or processing circuitry 1402 may be implemented by any type of integrated circuit, such as an Application Specific Integrated Circuit (ASIC), Field Programmable Gate Array (FPGA) etc. The memory 1404 may include one or several types of memory suitable for the processor, such as read-only memory (ROM), random-access memory, cache memory, flash memory devices, optical storage devices, solid state disk, hard disk drive etc.

Figure 15:
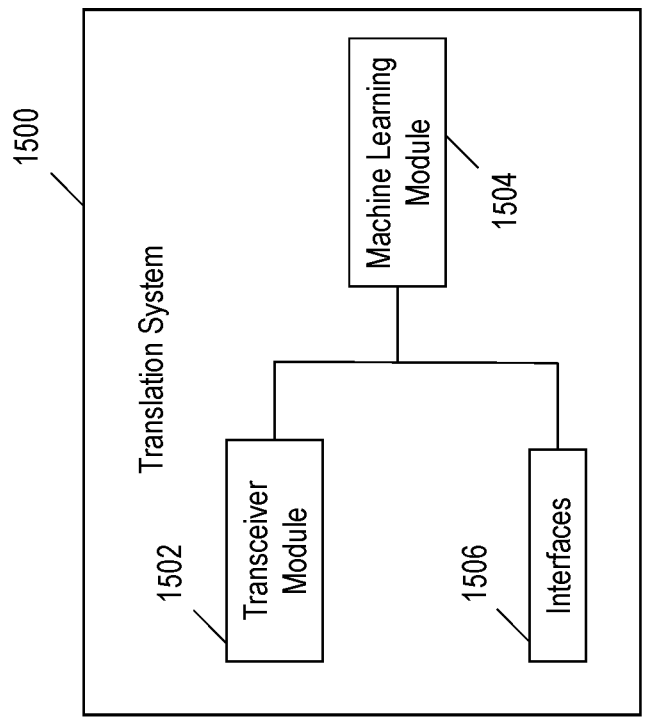
FIGS. 14 and 15 are block diagrams showing functional modules in examples of a translation system.

FIG. 15 illustrates functional units in another example of translation system 1500 which may execute examples of the methods 100 and/or 200 of the present disclosure, for example according to computer readable instructions received from a computer program. It will be understood that the units illustrated in FIG. 15 are functional units, and may be realized in any appropriate combination of hardware and/or software. The units may comprise one or more processors and may be integrated to any degree.

Referring to FIG. 15, the translation system 1500 is for translating a sensory input to a sensory output for communication between first and second entities, wherein the first entity comprises a user and the second entity comprises a user or a computing system. The translation system 1500 comprises a transceiver module 1502 for obtaining a first profile specifying a communication capability of the first entity, and a second profile specifying a communication capability of the second entity. The transceiver module is also for receiving an input sensory communication from one of the first or second entities, and for providing an output sensory communication to the other of the first or second entities. The translation system 1500 further comprises a Machine Learning module 1504 for obtaining a trained ML model operable to map an input sensory communication in accordance with one of the first or second profiles to an output sensory communication in accordance with the other of the first or second profiles. The ML module 1500 is also for using the ML model to map the input sensory communication to the output sensory communication. The translation system 1500 may further comprise interfaces 1506 which may be operable to facilitate communication with communication network nodes and/or user devices over suitable communication channels. The translation system 1500 may in some examples comprise a plurality of translation nodes, and each translation node may comprise a transceiver module 1502, ML module 1504 and interfaces 1506 as described above.

As discussed above, the method 300 may be performed by a training node, and the present disclosure provides a training node that is adapted to perform any or all of the steps of the above discussed methods. The training node may comprise a physical node such as a computing device, server etc., or may comprise a virtual node. A virtual node may comprise any logical entity, such as a Virtualized Network Function (VNF) which may itself be running in a cloud, edge cloud or fog deployment. The training node may for example comprise or be instantiated in any part of a communication network node such as a logical core network node, network management center, network operations center, Radio Access node etc. Any such communication network node may itself be divided between several logical and/or physical functions.

Figure 16:
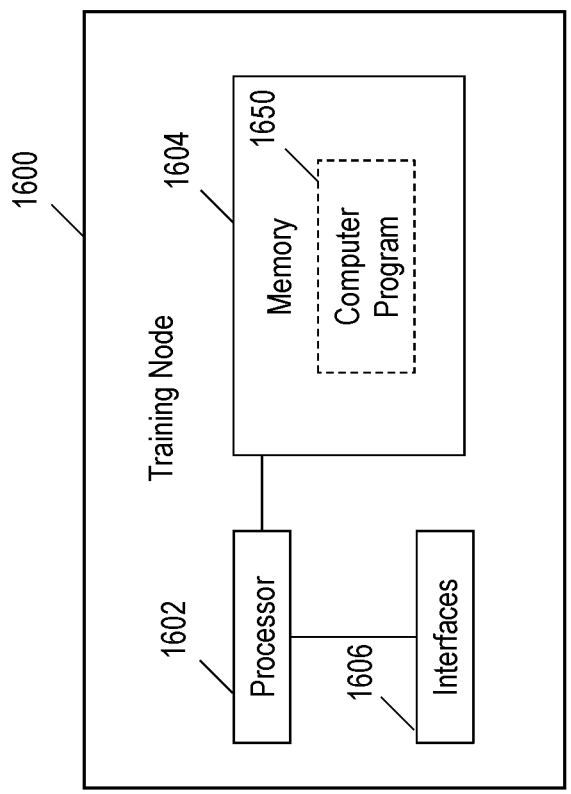

FIG. 16 is a block diagram illustrating an example training node 1600 which may implement the method 300, as illustrated in FIG. 3, according to examples of the present disclosure, for example on receipt of suitable instructions from a computer program 1650. Referring to FIG. 16, the training node 1600 comprises a processor or processing circuitry 1602, and may comprise a memory 1604 and interfaces 1606. The processing circuitry 1602 is operable to perform some or all of the steps of the method 300 as discussed above with reference to FIG. 3. The memory 1604 may contain instructions executable by the processing circuitry 1602 such that the training node 1600 is operable to perform some or all of the steps of the method 300, as illustrated in FIG. 3. The instructions may also include instructions for executing one or more telecommunications and/or data communications protocols. The instructions may be stored in the form of the computer program 1650. In some examples, the processor or processing circuitry 1602 may include one or more microprocessors or microcontrollers, as well as other digital hardware, which may include digital signal processors (DSPs), special-purpose digital logic, etc. The processor or processing circuitry 1602 may be implemented by any type of integrated circuit, such as an Application Specific Integrated Circuit (ASIC), Field Programmable Gate Array (FPGA) etc. The memory 1604 may include one or several types of memory suitable for the processor, such as read-only memory (ROM), random-access memory, cache memory, flash memory devices, optical storage devices, solid state disk, hard disk drive etc.

Figure 17:
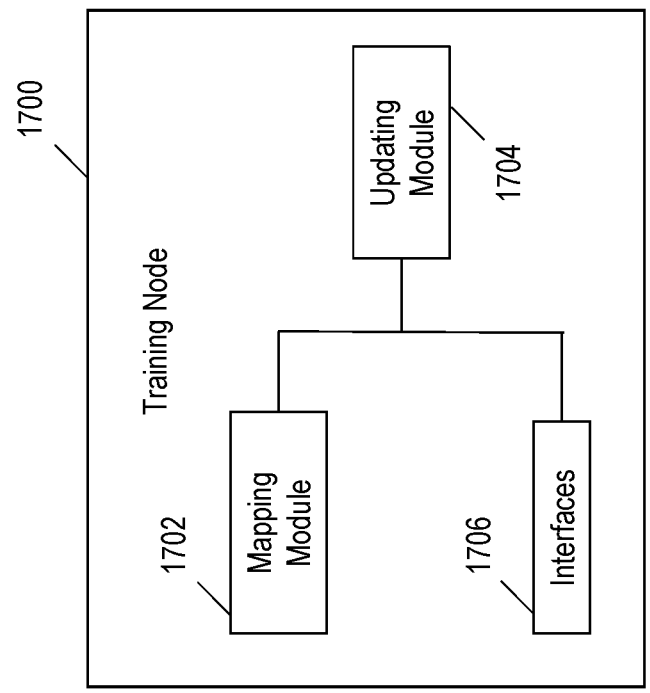
FIGS. 16 and 17 are block diagrams showing functional modules in examples of a training node.

FIG. 17 illustrates functional units in another example of training node 1700 which may execute examples of the method 300 of the present disclosure, for example according to computer readable instructions received from a computer program. It will be understood that the units illustrated in FIG. 17 are functional units, and may be realized in any appropriate combination of hardware and/or software. The units may comprise one or more processors and may be integrated to any degree.

Referring to FIG. 17, the training node 1700 is training a Machine Learning model to map an input sensory communication in accordance with a first communication capability to an output sensory communication in accordance with a second communication capability, wherein the ML model is for use in translating a sensory input to a sensory output for communication between first and second entities, and wherein the first entity comprises a user and the second entity comprises a user or a computing system. The training node 1700 comprises a mapping module 1702 for using a reference ML model to map input sensory communications from a training data set to a representation of an information content of the input sensory communications; wherein the input sensory communications are expressed using a plurality of sensory capabilities. The mapping module 1702 is also for using a target ML model to map the input sensory communications from the training data set to a representation of the information content of the input sensory communications; wherein the input sensory communications are expressed using a subset of the plurality of sensory capabilities. The training node 1700 further comprises an updating module 1704 for updating trainable parameters of the target ML model to minimize a loss function based upon a difference between the representations generated by the reference and target ML models. The training node 1700 may further comprise interfaces 1706 which may be operable to facilitate communication with communication network nodes and/or user devices over suitable communication channels.

Figure 18:
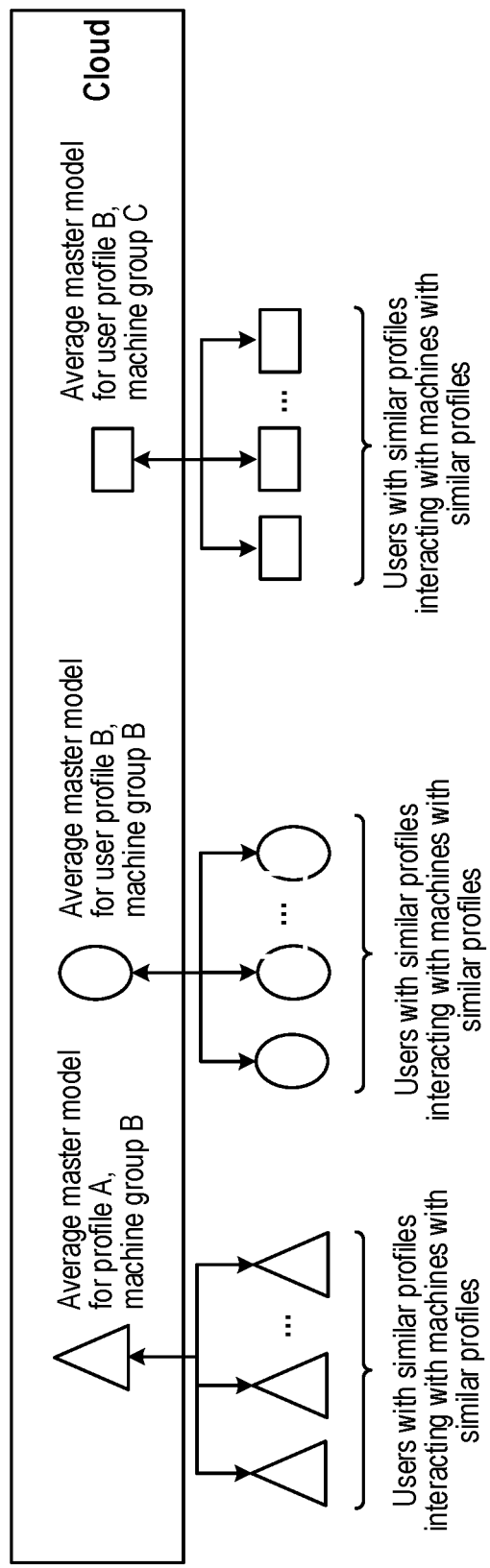
FIG. 18 illustrates collaborative training of multiple models in a model repository using Federated Learning.

The training node may as discussed above be implemented in a cloud deployment. As the training of the ML models from translating sensory communications may involve distributed users and computing systems (machines), the training may be performed in accordance with a Federated Learning scheme orchestrated from the cloud. Users with similar profiles that are interacting with similar machines can train a neural network machine learning model collaboratively by sending updates to the training node. The collaborative training of multiple models in a model repository using Federated Learning is illustrated in FIG. 18.

The training node may for example be implemented as a model serving device as illustrated in FIGS. 5 and 6, and may be located within a Radio Access Network (RAN) Intelligent Controller (RIC) RIC in an Open-RAN (O-RAN) framework. O-RAN is an inter-operability standard for different radio access network elements. Examples of the present disclosure allow for vendor-agnostic seamless communication between a user device (PUE) and any machine system using translator machine learning models, regardless of the original vendor-specific implementations and protocols. Examples of the present disclosure are consequently highly applicable to implementations within O-RAN. For example communication between the user device, machine and any cloud elements may be over a radio access interface through a RAN. Managing, training, and serving machine learning translation models can be implemented within the Non-Realtime RIC. In addition, user devices associated with users having one or more disabilities can be prioritized via a suitably designed rApp.

Examples of the present disclosure thus provides methods, a system and nodes which facilitate communication between entities having different sensory communication capabilities. These methods may for example facilitate interaction between a human user having a disability relating to sensory or actuation ability and an automated machine. According to examples of the present disclosure, user and machine profiles are obtained including communication capabilities. Authentication information may also be obtained and, in some examples, a camera, microphone, or any input peripheral device at the serving machine may also detect communication capabilities, other elements of a user profile, environmental information, or any other usable input attributes. Peripherals may be of particular use in the event of a failure in sharing user profile or other information. A context for the interaction between the user and machine may also be obtained, including a task to be performed. A translator ML model is then selected to map an input sensory communication from one of the user or the machine to an output sensory communication suitable for the other of the user or the machine. The user and machine may have communication capabilities that are not fully compatible, for example if the user lacks a sensory or actuation capability that was assumed to be present at the time the machine was designed. The selected model then maps communications between user and machine to enable an interaction between user and machine to take place, and a task to be accomplished. Examples of the present disclosure thus enable an existing machine to serve a user regardless of the communication capabilities of the user and machine.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computer implemented method for translating a sensory input to a sensory output for communication between a first entity and a second entity, the first entity comprising a first user and the second entity comprises a second user or a computing system, the method, performed by a translation system, comprising:
   obtaining a first profile specifying a communication capability of the first entity, and a second profile specifying a communication capability of the second entity;
   obtaining a trained Machine Learning, ML, model configured to map an input sensory communication in accordance with one of the first profile or second profile to an output sensory communication in accordance with the other of the first profile or second profile;
   receiving an input sensory communication from one of the first entity or second entity;
   using the ML model to map the input sensory communication to an output sensory communication; and
   providing the output sensory communication to the other of the first entity or second entity;
   wherein obtaining a trained ML model configured to map an input sensory communication in accordance with one of the first profile or second profiles to an output sensory communication in accordance with the other of the first profile or second profile comprises:
   obtaining, from a repository, a candidate set of at least one trained ML model configured to map an input sensory communication in accordance with one of the first profile or second profile to an output sensory communication in accordance with the other of the first profile or second profile; and selecting, from the candidate set, an ML model for use in translation of communication between the first and second entities.

2. The method as claimed in claim 1, wherein the input sensory communication is received from an entity comprising a user; and wherein receiving the input sensory communication comprises receiving a representation, generated by a user device of the user, of a sensory communication input by the user to the user device.

3. The method as claimed in claim 1, wherein the other of the first entity or second entity comprises a user; and wherein providing the output sensory communication to the other of the first entity or second entity comprises providing to a user device of the user a representation of the output sensory communication, wherein the user device is configured to generate the output sensory communication for the user from the provided representation.

4. The method as claimed in claim 1, wherein a communication capability comprises at least one of a sensory capability or an actuation capability.

5. The method as claimed in claim 1, wherein a sensory communication comprises a communication the reception and interpretation of which requires a sensory capability.

6. The method as claimed in claim 5, wherein the received input sensory communication and the provided output sensory communication require different sensory capabilities for reception and interpretation.

7. The method as claimed in claim 1, wherein a sensory communication in accordance with a profile of an entity comprises at least one of: a sensory communication in a format that is compatible with a sensory capability of the entity; or a sensory communication in a format from which or to which the entity, or a user device associated with the entity, is configured to translate.

8. The method as claimed in claim 1, wherein obtaining at least one of a first profile or second profile specifying a communication capability of the first or second entity comprises at least one of:
retrieving the first or second profile from a memory;
receiving the first or second profile in a message; and
detecting component elements of the first profile or second profile using a sensor.

9. The method as claimed in claim 1, wherein selecting, from the candidate set, an ML model for use in translation of communication between the first entity and second entity comprises selecting an ML model using feedback provided for ML models in the candidate set from users of the ML models.

10. The method as claimed in claim 1, further comprising obtaining a context for the communication between first entity and second entity; and wherein selecting, from the candidate set, an ML model for use in translation of communication between first entity and second entity comprises using the obtained context to select the ML model.

11. The method as claimed in claim 10, wherein the obtained context comprises an identification of a task to be achieved through the communication between the first entity and second entity.

12. The method as claimed in claim 1, further comprising:
receiving an authentication token from at least one of the first entity and second entity;
and using the authentication token to authenticate the first or second entity.

13. The method as claimed in claim 1, wherein using the ML model to map the input sensory communication to an output sensory communication comprises: inputting to the ML model a representation of the input sensory communication, wherein the representation is processed by the ML model in accordance with trained values of the ML model parameters; and obtaining from the ML model an output sensory communication comprising a representation of information contained in the input sensory communication.

14. The method as claimed in claim 13, wherein the representation of information contained in the input sensory communication comprises at least one of: a representation of the information in a format that is compatible with a sensory capability of the entity to which the output sensory communication is provided; or a sensory communication in a format from which the entity to which the output sensory communication is provided, or a user device associated with the entity, is configured to translate.

15. The method as claimed in claim 1, wherein the ML model comprises at least one of:
a multi-input-multi output Neural Network;
a split Neural Network;
a conditional Variational AutoEncoder, cVAE;
a generative model; and
a Natural Language Processing model.

16. The method as claimed in claim 1, further comprising:
receiving feedback from at least one of the first or second entities; and performing at least one of:
providing the feedback to a training node for inclusion in a training data set for the obtained ML model;
providing the feedback to a management node for inclusion in a training data set for a selection model for selecting ML models for translating a sensory input to a sensory output for communication between first entity and second entity;
using the feedback in a training process to update the obtained ML model; or
using the feedback in a training process to update a model for selecting ML models for translating a sensory input to a sensory output for communication between first entity and second entity.

17. The method as claimed in claim 1, wherein the input sensory communication requires a sensory capability for reception and interpretation that is:
not present in the profile of the entity to which the output sensory communication is provided;
identified in the profile of the entity to which the output sensory communication is provided as non-optimal under at least some conditions; or
identified in the profile of the entity to which the output sensory communication is provided as unavailable under at least some conditions.

18. The method as claimed in claim 1, wherein the output sensory communication requires an actuation capability for generation of the output sensory communication that is:
not present in the profile of the entity from which the input sensory communication is received;
identified in the profile of the entity from which the input sensory communication is received as non-optimal under at least some conditions; or
identified in the profile of the entity from which the input sensory communication is received as unavailable under at least some conditions.

* * * * *